United States Patent
DeBates et al.

(10) Patent No.: US 10,831,246 B2
(45) Date of Patent: Nov. 10, 2020

(54) VIRTUAL BUTTON MOVEMENT BASED ON DEVICE MOVEMENT

(71) Applicant: Motorola Mobility LLC, Chicago, IL (US)

(72) Inventors: Scott Patrick DeBates, Crystal Lake, IL (US); Douglas Alfred Lautner, Round Lake, IL (US); Jagatkumar V. Shah, Lake In The Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/650,067

(22) Filed: Jul. 14, 2017

(65) Prior Publication Data

US 2019/0018461 A1    Jan. 17, 2019

(51) Int. Cl.
   *G06F 3/0488*   (2013.01)
   *G06F 1/16*     (2006.01)
   *G06F 3/01*     (2006.01)
   *G06F 21/32*    (2013.01)

(52) U.S. Cl.
   CPC .......... *G06F 1/1684* (2013.01); *G06F 1/1601* (2013.01); *G06F 1/1626* (2013.01); *G06F 3/016* (2013.01); *G06F 3/017* (2013.01); *G06F 3/04883* (2013.01); *G06F 3/04886* (2013.01); *G06F 21/32* (2013.01)

(58) Field of Classification Search
   CPC ........ G06F 3/00; G06F 3/0412; G06F 3/0416; G06F 3/0481; G06F 3/04817; G06F 3/0482; G06F 3/0487; G06F 3/04883; G06F 3/04886; G06F 2203/04808
   USPC ........................................... 345/173
   See application file for complete search history.

(56) References Cited

U.S. PATENT DOCUMENTS

| | | |
|---|---|---|
| 7,551,814 B1 | 6/2009 | Smits |
| 8,493,342 B2 | 7/2013 | Park et al. |
| 10,498,890 B2 | 12/2019 | DeBates et al. |
| 2013/0009890 A1 | 1/2013 | Kwon |
| 2013/0159931 A1 | 6/2013 | Lee et al. |
| 2013/0300668 A1 | 11/2013 | Churikov |
| 2014/0320536 A1* | 10/2014 | Mok ........................ G06T 3/60 345/659 |
| 2014/0375574 A1* | 12/2014 | Kim ........................ G06F 3/147 345/173 |
| 2014/0375582 A1* | 12/2014 | Park ...................... G06F 3/0414 345/173 |
| 2015/0062206 A1 | 3/2015 | Osborne |

(Continued)

OTHER PUBLICATIONS

"Restriction Requirement", U.S. Appl. No. 15/650,006, dated Nov. 28, 2018, 8 pages.

(Continued)

*Primary Examiner* — Jason M Mandeville
(74) *Attorney, Agent, or Firm* — SBMC

(57) ABSTRACT

Various embodiments provide dynamic display locations of virtual control buttons based upon detected movement of a computing device. A computing device displays a virtual control button at a first location, such as a location based upon a grip profile. At some point later, the computing device detects movement via a sensor included in the computing device. Upon detecting the movement, the computing device visually moves the virtual control button to at least a second location based upon the detected movement.

17 Claims, 18 Drawing Sheets

(56) References Cited

U.S. PATENT DOCUMENTS

| | | | |
|---|---|---|---|
| 2015/0100910 A1 | 4/2015 | Luo | |
| 2015/0160699 A1* | 6/2015 | Choi | G06F 1/1643 |
| | | | 345/173 |
| 2015/0160770 A1 | 6/2015 | Stewart et al. | |
| 2015/0205400 A1* | 7/2015 | Hwang | G06F 3/044 |
| | | | 345/654 |
| 2016/0253039 A1* | 9/2016 | Heo | G06F 3/0412 |
| | | | 345/173 |
| 2016/0274622 A1* | 9/2016 | Braun | G06F 1/1694 |
| 2016/0283053 A1* | 9/2016 | Shi | G06F 3/041 |
| 2016/0291731 A1* | 10/2016 | Liu | G06F 1/1656 |
| 2017/0115782 A1* | 4/2017 | Hinckley | G06F 3/0346 |
| 2017/0152966 A1 | 6/2017 | Krah et al. | |
| 2017/0264818 A1 | 9/2017 | Liao | |
| 2017/0357440 A1* | 12/2017 | Tse | G06K 9/0002 |
| 2018/0157409 A1* | 6/2018 | Jung | G06F 3/04883 |
| 2018/0247065 A1 | 8/2018 | Rhee et al. | |
| 2019/0018461 A1 | 1/2019 | DeBates et al. | |
| 2019/0018588 A1 | 1/2019 | DeBates et al. | |
| 2019/0020760 A1 | 1/2019 | DeBates et al. | |

OTHER PUBLICATIONS

"Non-Final Office Action", U.S. Appl. No. 15/650,006, dated Mar. 18, 2019, 17 pages.

"Non-Final Office Action", U.S. Appl. No. 15/650,048, dated May 29, 2019, 26 pages.

"Advisory Action", U.S. Appl. No. 15/650,006, dated Aug. 8, 2019, 3 pages.

"Final Office Action", U.S. Appl. No. 15/650,006, dated Jul. 15, 2019, 19 pages.

"Non-Final Office Action", U.S. Appl. No. 15/650,006, dated Sep. 18, 2019, 20 pages.

"Notice of Allowance", U.S. Appl. No. 15/650,048, dated Oct. 15, 2019, 15 pages.

"Final Office Action", U.S. Appl. No. 15/650,006, dated Apr. 7, 2020, 23 pages.

"Corrected Notice of Allowability", U.S. Appl. No. 15/650,048, dated Oct. 29, 2019, 2 pages.

"Notice of Allowance", U.S. Appl. No. 15/650,006, dated Jun. 29, 2020, 16 pages.

* cited by examiner

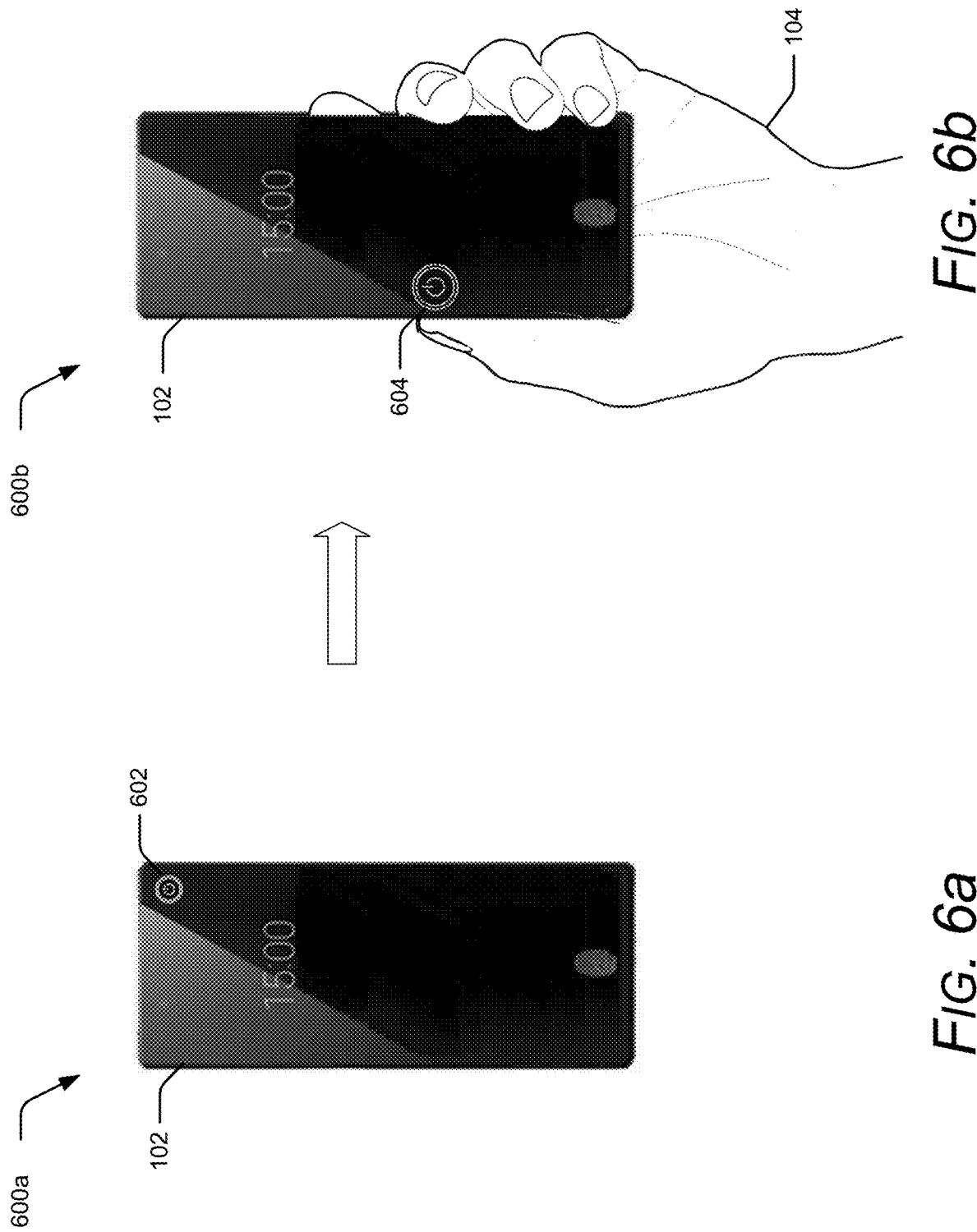

VIRTUAL BUTTON MOVEMENT BASED ON DEVICE MOVEMENT

BACKGROUND

Mechanical buttons on a device provide users with a way to interact with, and control operation of, the device. However, the fixed nature of these buttons may not conform physically with all users, causing discomfort or erroneous input when the user cannot easily reach the button. Further, the physical mechanics of these buttons oftentimes fail after repeated use, causing a reliability issue in the corresponding device.

BRIEF DESCRIPTION OF THE DRAWINGS

Embodiments for virtual control buttons on a computing device are described with reference to the following Figures. The same numbers may be used throughout to reference like features and components that are shown in the Figures:

FIGS. 6a and 6b illustrate an example of visually moving a virtual control button in accordance with one or more embodiments;

DETAILED DESCRIPTION

Overview

Figure 1:
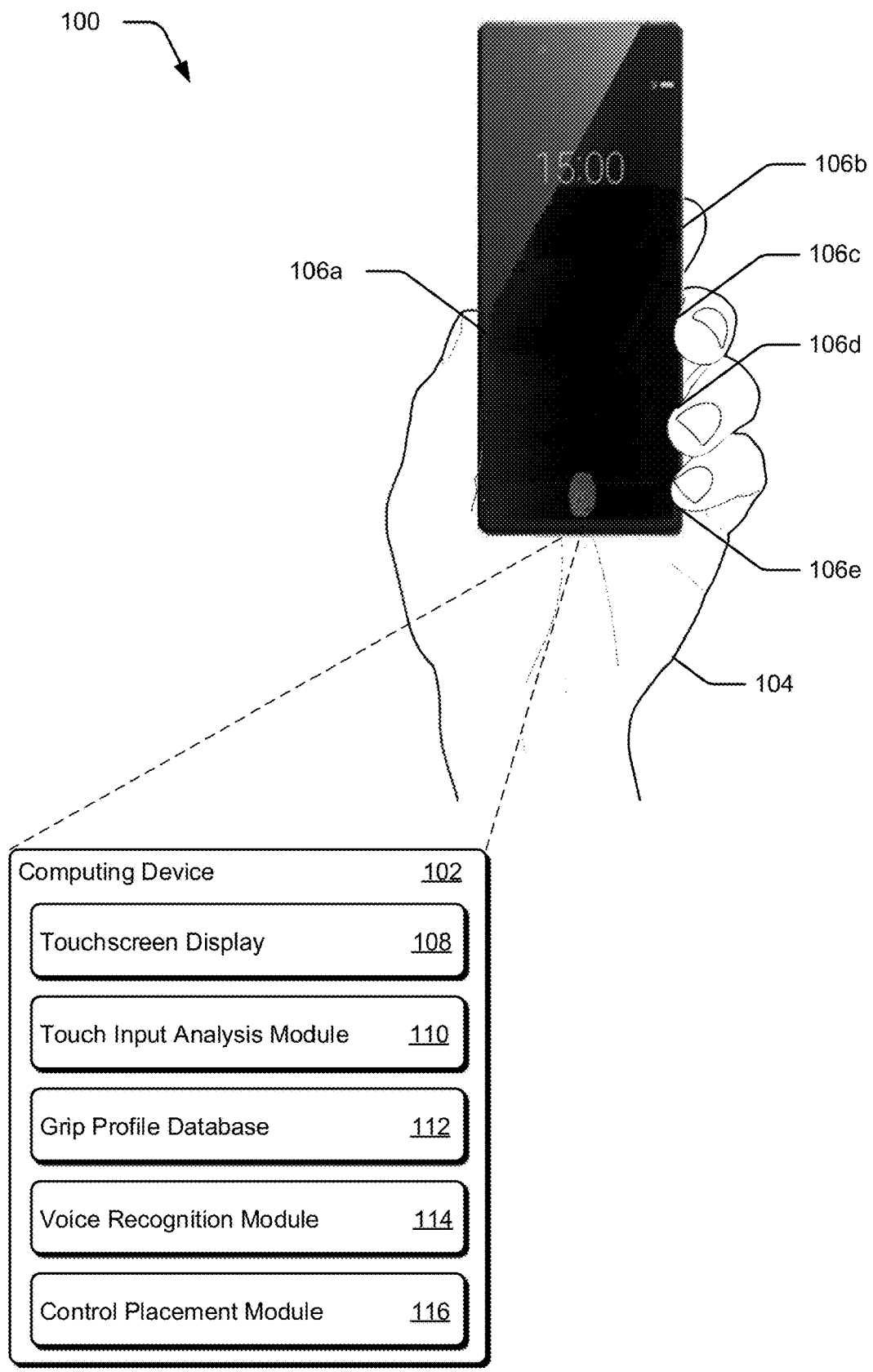
FIG. 1 illustrates an example operating environment in accordance with one or more embodiments.

Various embodiments provide virtual control buttons on a computing device, such as a mobile device, e.g. a smart phone, to produce a computing device without mechanical user interface buttons. The computing device can include a touchscreen display overlaid on the computing device such that a front surface of the touchscreen display covers a front surface of the computing device, and one or more side surfaces of the touchscreen display wrap around one or more edges of the computing device, e.g., a top edge, a bottom edge, and/or side edges of the computing device. To simplify building a computing device, and in lieu of mechanical user interface buttons, various embodiments display virtual control buttons via the touchscreen display. As various surfaces of the touchscreen display detect touch input, some embodiments identify a grip profile of a user, and visually place or move the virtual control buttons to locations based on the grip profile.

Alternately or additionally, in at least some embodiments, a computing device detects a modular attachment that is mounted or attached to the computing device such that the two can exchange information. Upon detecting the modular attachment, the computing device receives a request from the modular attachment to register one or more controls with the computing device. The controls are associated with functionality provided by the modular attachment. In turn, the computing device displays a virtual control button or buttons on a touchscreen display to provide control of the modular attachment.

Alternately or additionally, other embodiments provide virtual control buttons that are voice-activated. In some embodiments, a computing device receives audio input, such as through a microphone. Upon receiving the audio input, the computing device identifies, through analysis of the audio input, an input command. The analysis can sometimes include voice authentication associated with a user. Upon identifying the input command, the computing device visually displays a virtual control button on a touchscreen display. In some embodiments, the computing device displays the virtual control button at a location corresponding to a current grip in contact with the touchscreen display.

Alternately or additionally, various embodiments provide dynamic display locations of virtual control buttons based upon detected movement of a computing device. A computing device displays a virtual control button at a first location, such as a location based upon a grip profile. At some point later, the computing device detects movement via a sensor included in the computing device. The movement can be any type or form of movement, such as a tilt away from an original position or a movement from a resting position to an active position as further described herein. Upon detecting the movement, the computing device visually moves the virtual control button to at least a second location based upon the detected movement.

The various embodiments described herein thus provide a computing device with virtual control buttons instead of mechanical buttons. By including virtual control buttons on the computing device with which a user may interface, and, in at least some embodiments, excluding mechanical user interface buttons, the user is provided with a more robust computing device that is less prone to mechanical failures. This can also simplify the manufacturing process by reducing the number of mechanical parts included in the computing device, which, in turn, reduces the consumer cost. Another advantage to virtual control buttons pertains to various types of customized placement as further described herein. Customizing the display of virtual control buttons helps reduce frustrations users may experience by visually locating the virtual control buttons at more optimal positions for the user. This, in turn, helps to reduce input error because a user can more easily reach the virtual control button or buttons.

While features and concepts for virtual control buttons in a computing device can be implemented in any number of different devices, systems, environments, and/or configurations, embodiments for virtual control buttons are described in the context of the following example devices, systems, and methods.

Example Operating Environment

FIG. 1 illustrates example environment 100 according to one or more embodiments. Environment 100 includes computing device 102, which takes the form of a mobile device in the form of a smart phone. Here, a user's hand 104 holds computing device 102, thus causing the fingers to be in contact with the device at various locations. For example, the thumb of user hand 104 makes contact with computing device at location 106a. In a similar fashion, the index finger of user hand 104 makes contact at location 106b, the middle finger of user hand 104 makes contact at location 106c, the ring finger of user hand 104 makes contact at location 106d, and the little finger of user hand 104 makes contact at location 106e. By receiving input at these various points of contact, and considering the input and points in combination, computing device 102 can identify a grip profile of a user. Once the grip profile is identified, one or more virtual control buttons may be visually moved to various locations based on the grip profile as further described herein.

Computing device 102 includes touchscreen display 108 as an input/output device. For instance, a user can enter input into computing device 102 by physically interacting with the display at various locations using finger(s) and/or stylus. The user can also receive output from computing device in the form of a visual display. Among other things, touchscreen display 108 captures information about the user's physical interaction, such as a location of the interaction, a size or area used to interact (e.g., a fingerprint size or shape), duration of the interaction, movement of the interaction, and so forth. In some embodiments, touchscreen display 108 wraps around one or more edges of the computing device, e.g., the top edge, the bottom edge, and/or the side edges of computing device to form, in at least some instances, a bezel-less display. Since the touchscreen display wraps around the various sides of computing device 102, a user can enter input by touching these various sides instead of, or in addition to, touching a front surface of touchscreen display 108 as further described herein. For example, touchscreen display 108 can capture information about interactions that occur at locations 106a-106e using various portions of the display that extend from the front surface to wrap around the sides of the computing device. Thus, a user can enter input to computing device 102 by simply touching the side surfaces of the touchscreen display.

Computing device 102 also includes touch input analysis module 110, grip profile database 112, voice recognition module 114, and control placement module 116. Among other things, touch input analysis module 110 identifies various forms of touch input received via touchscreen display 108. For example, the touch input analysis module 110 can receive input information from touchscreen display 108 for each respective source of input currently in contact with the display (e.g., input information corresponding to locations 106a-106e), and identify a grip profile from the information. Here, identifying a grip profile corresponds to identifying placement of a user's digits or fingers around the display and/or ascertaining various characteristics about each digit to enable future detection of the grip. Identifying a grip profile can also include mapping each respective location of contact with the display to a respective digit or finger included in the grip (e.g., identifying a location associated with the thumb as a singular source of contact on one side of the device, identifying a location associated with the index finger as the topmost source of contact on the opposite side, etc.). Identifying the grip profile can also include determining that the current grip in contact with the touchscreen display corresponds to a known grip profile. For example, touch input analysis module 110 can access grip database 112 to map touch input information from the current grip in contact the touchscreen display to a grip profile stored in grip database 112. Alternately or additionally, touch input analysis module 110 may store a new grip profile in a grip profile database 112 when the current grip in contact with the touchscreen display is unknown. Touch input analysis module 110 can also identify various types of input gestures, such as a tap gesture, a swipe gesture, a hold gesture (e.g., a user is simply holding the computing device), and so forth.

Grip profile database 112 stores grip information and/or user preferences associated with a grip profile. For instance, consider an example in which touch input analysis module 110 identifies a current grip in contact with computing device 102 as corresponding to a known grip profile stored in grip profile database 112. To match the current grip in contact with a known grip profile, touch input analysis module 110 can compare various characteristics of the current grip with information stored in grip profile database 112 to find matching characteristics. Any suitable type of characteristic can compared (e.g., right hand grip identification, left hand grip identification, distance between an index finger contact location and a middle finger contact location, size of the thumb contact area, fingerprint, thumb print, etc.). Some embodiments look for exact matches, while other embodiments compare the characteristics to find similar characteristics that fall within a predetermined threshold of error.

Grip profile database 112 can also store user preferences and/or user customizations with a grip profile. For instance, some embodiments generate statistics to identify which digit or finger the user prefers or uses most often, which digit or finger is used the least often, the last digit or finger used to interact with a virtual control button, and so forth. In turn, these statistics can be stored with the corresponding grip profile in grip profile database 112. Subsequently, when touch input analysis module 110 matches a current grip to a known grip profile, control placement module 116 can visually move a virtual control button to a location based upon any of these statistics, such as a location corresponding to the most frequently used finger. When a user customizes a virtual control button by manually moving the virtual control button to a preferred location, the corresponding grip profile can store this in formation as well. For instance, consider user customization in which the user has repositioned a virtual power control button to a preferred location. Subsequently, when computing device 102 identifies that the user has logged on, such as through a fingerprint and/or an identification through a current grip in contact with the computing device, the computing device visually moves the virtual power control button to the user-customized location by pulling information from the corresponding grip profile stored in grip profile database 112.

Voice recognition module 114 identifies words or commands from audio input. For example, voice recognition module 114 can receive audio input from a microphone connected to, or included in, computing device 102. In turn, voice recognition module 114 extracts or identifies audible words or commands included within the audio input. Any suitable type of speech recognition algorithm and/or model can be used to identify the words or commands, such as Hidden Markov models, dynamic time warping (DTW) based algorithms, neural networks, and so forth. In some embodiments, voice recognition module 114 includes training software to customize speech recognition algorithms to a particular voice. As one example, the training software can prompt a user to audibly state known words or commands, and subsequently train on these known words or command to increase the reliability of their detection based on the user. In some embodiments, voice recognition module 114 can identify a particular word spoken by a particular user, such as a passcode audibly spoken by an authorized user. Accordingly, voice recognition module 114 can identify words or commands, as well as identify a particular user that audibly states the words or commands.

Control placement module 116 manages the visual placement and/or display of virtual control buttons on touchscreen display 108. For instance, control placement module 116 can use information generated by touch input analysis module 110 to visually move a virtual control button from a first location to a second location that corresponds to a current finger in contact with the touchscreen display. Alternately or additionally, control placement module 116 can use information from grip profile database 112 to visually move the virtual control button or buttons to a user-preferred location and/or a location associated with a specific finger. As another example, control placement module 116 can use information generated by voice recognition module 114 to identify a particular virtual control button to display and/or visually move based upon an identified word or command. Accordingly, control placement module 116 works in concert with touch input analysis module 110, grip profile database 112, and/or voice recognition module 114 to manage display locations of virtual control buttons. Thus, control placement module manages displaying a virtual control button at a preferred or default location and visually moving the virtual control button to a location based upon a current grip in contact with the computing device and/or based upon user preferences, and so forth.

In some embodiments, control placement module 116 dynamically moves a virtual control button based upon a corresponding movement of the current touch input and/or movement of the computing device as further described herein. For example, as a finger in contact with touchscreen display 108 moves or slides down a side of computing device 102, some embodiments of control placement module 116 slide a virtual control button down the side of computing device 102 to track or mimic the movement of the finger. In other embodiments, control placement module 116 dynamically moves a virtual control button based on a detected tilting motion or device movement. Thus, control placement module 116 can alternately or additionally receive movement input information from various sensors, and alter a displayed location of the virtual control button based upon this movement as further described herein.

Control placement module 116 also manages which virtual control buttons are displayed and when. For instance, control placement module 116 can receive a request to register a control as a virtual control button from a modular attachment, and subsequently display the virtual control button corresponding to the registration request and/or the modular attachment. Control placement module 116 can also visually replace a first virtual control button at a particular location with a second virtual control button at that particular location. For instance, the first virtual control button can be an audio control button that is used to control the volume of audio playback and is displayed at a location that corresponds to a most often used finger. Upon identifying an incoming call, control placement module 116 can visually replace the audio control button with a call management control button at the same location, as further described herein.

Figure 2:
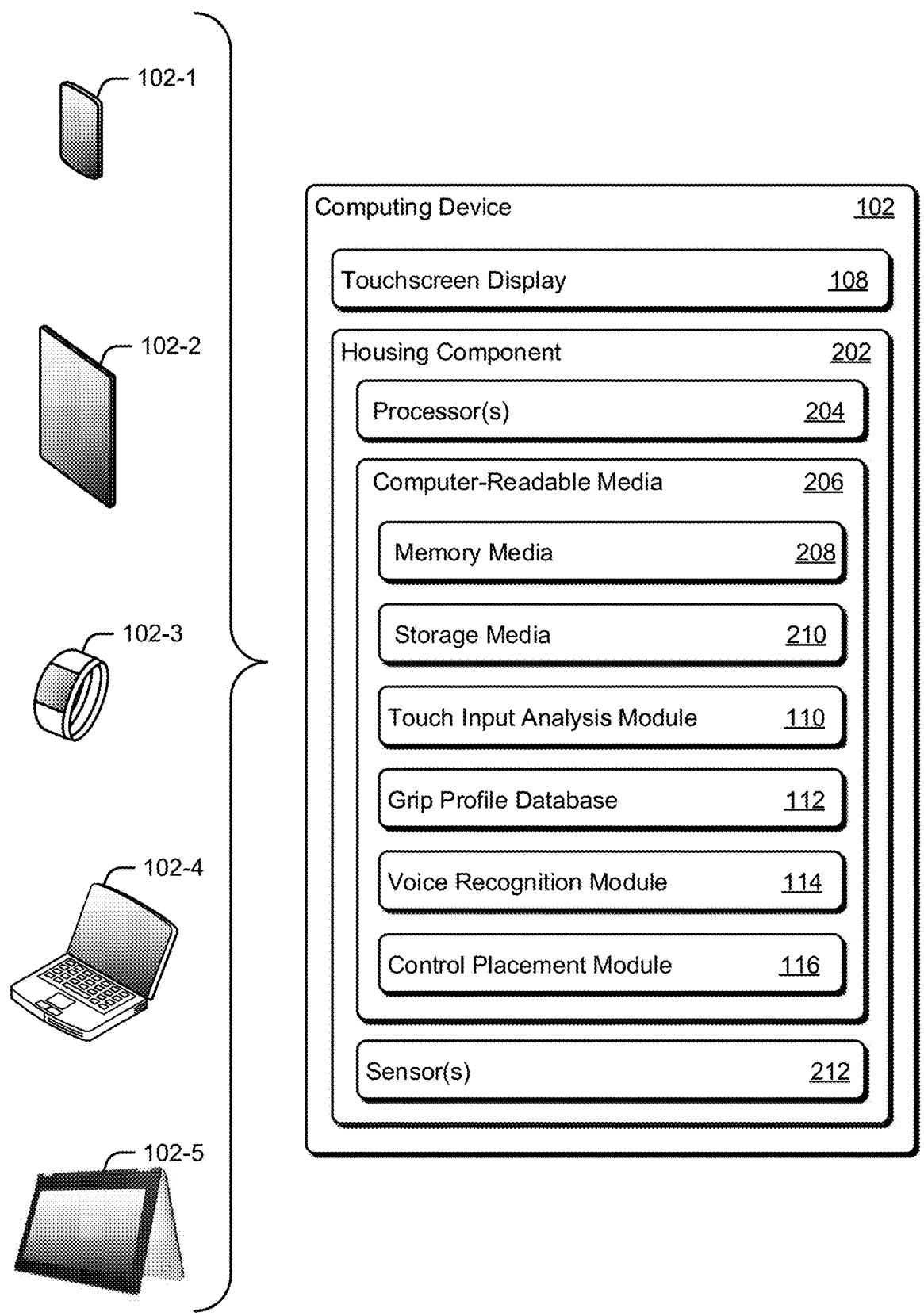
FIG. 2 illustrates an example computing device in accordance with one or more embodiments.

FIG. 2 illustrates an expanded view of computing device 102 of FIG. 1 as being implemented by various non-limiting example devices including: smartphone 102-1, tablet 102-2, smart watch 102-3, laptop 102-4, and convertible laptop 102-5. Accordingly, computing device 102 is representative of any suitable device that incorporates virtual control buttons in a computing device. Computing device 102 includes housing component 202 to house or enclose various components within the computing device. Housing component 202 can be a single solid piece, or can be constructed from multiple pieces. The housing component can be constructed from any suitable material, such as metal, silicone, plastic, injection molded material, and so forth. In the cases where housing component 202 is constructed from multiple pieces, each piece can be of a same material, or can incorporate different materials from one another. Among other things, housing component 202 defines the boundaries or shape associated with computing device 102, such as, a top edge, a bottom edge, a right edge and a left edge in the case of a rectangular-shaped computing device, a circumference edge of a circular-shaped computing device, and so forth. To provide touch input for computing device 102, touchscreen display 108 of FIG. 1 is coupled with housing component 202 and/or various components residing within housing component 202. In some embodiments, portions of touchscreen display 108 extend to wrap around and over the various edges of housing component 202 (e.g., the top edge, the bottom edge, the right edge, the left edge), thus providing capacitive touch input on sides of computing device 102.

Computing device 102 also includes processor(s) 204 and computer-readable media 206, which includes memory media 208 and storage media 210. Here processors 204 and computer-readable media 206 reside within housing component 202. In some embodiments, processor(s) 204 include at least one application processor and at least one low power contextual processor. Applications and/or an operating system (not shown) embodied as computer-readable instructions on computer-readable media 206 are executable by processor(s) 204 to provide some, or all, of the functionalities described herein. For example, various embodiments can access an operating system module, which provides high-level access to underlying hardware functionality by obscuring implementation details from a calling program, such as protocol messaging, register configuration, memory access, and so forth.

Computer-readable media 206 includes touch input analysis module 110, grip profile database 112, voice recognition module 114, and control placement module 116 of FIG. 1. However, in alternate embodiments, varying combinations of these modules can be included and/or excluded. While touch input analysis module 110, grip profile database 112, voice recognition module 114, and control placement module 116 are illustrated here as residing on computer-readable media 206, they can alternately or additionally be implemented using hardware, firmware, software, or any combination thereof.

Computing device 102 also includes one or more sensors 212 that represent an ability to sense motion or movement. For instance, sensors 212 can include an accelerometer, gyroscope, and/or a camera to detect motion near, or tilt associated with, computing device 102. Alternately or additionally, sensors 212 can include audio sensors to detect input noises and/or voice commands, and/or haptic sensors to deliver tactile interactions with a user. In some embodiments, sensors 212 work in concert with touch input analysis module 110, grip profile database 112, voice recognition module 114, and/or control placement module 116 to visually display and/or move virtual control buttons.

Having described an example operating environment in which various embodiments can be utilized, consider now a discussion of detecting a grip profile in accordance with one or more embodiments.

Detecting a Grip Profile

One of the challenges for manufacturers of electronic devices is the push to make the devices more affordable, include evolved functionality, and have a reduced size relative to previous devices. For instance, many consumers desire waterproof devices, since the consumers are able to transport these devices to less friendly environments that expose the device to water, such as a pool, a kitchen, a bathroom, a beach, and so forth. Thus, waterproofing an electronic device can be a design parameter manufactures desire to achieve. However, each aperture or hole included in the device, such as those used to expose mechanical buttons, increases the difficulty of waterproofing the device and provides a potential entry point for water.

Manufacturers also strive to reduce the number of parts used to build a device since a reduced number of parts simplifies the manufacturing process by simplifying the assembly process. In turn, this can reduce the cost of building the device, which cost savings can be passed on to a consumer. Another advantage to a device with reduced parts is increased reliability relative to a device with more parts. For instance, mechanical buttons can fail over time after repeated use as the physical parts begin to show signs of wear. Accordingly, it can be desirable to include less mechanical buttons for product reliability, as well as cost control.

Another challenge is that manufacturers strive to increase display sizes of an electronic device without increasing the overall device size or footprint. For instance, a particular device can have a form factor that researchers have deemed an optimal or desirable size for most users. In such an instance, it can be challenging to manufacturers to increase the corresponding display without increasing the form factor. Thus, the evolution of electronic devices to incorporate increased functionality, reduced cost, increased reliability, and so forth, poses a challenge to manufacturers.

Various embodiments provide virtual control buttons on a computing device, such as a mobile phone, e.g., a smart phone, to produce a computing device without mechanical user interface buttons. Among other things, the removal of mechanical user interface buttons can improve the reliability of the corresponding computing device by reducing the number of components prone to failure after repeated use. The computing device can include a touchscreen display that comprises a front surface that covers a front surface of the computing device, and side surfaces that wrap around multiple edges of the computing device such as two or more of a top edge, a bottom edge, left or right side edges of the computing device. In lieu of mechanical user interface buttons, various embodiments display virtual control buttons via the touchscreen display. By using virtual control buttons in lieu of the mechanical buttons, the touchscreen display does not include apertures or holes to expose the mechanical buttons. In turn, the smooth and aperture-free surface of the touchscreen display provides improved waterproofing of the corresponding computing device. Extending the touchscreen display to wrap over and around the edges of the computing device also allows for a bezel-less display, thus increasing the size of the display area in which to display the virtual control buttons, and the size of the input surface area where a user can enter input. Some embodiments use the increased input surface area to identify a grip profile of a user, and subsequently visually move or surface the virtual control buttons to locations based on the grip profile.

Figure 3:
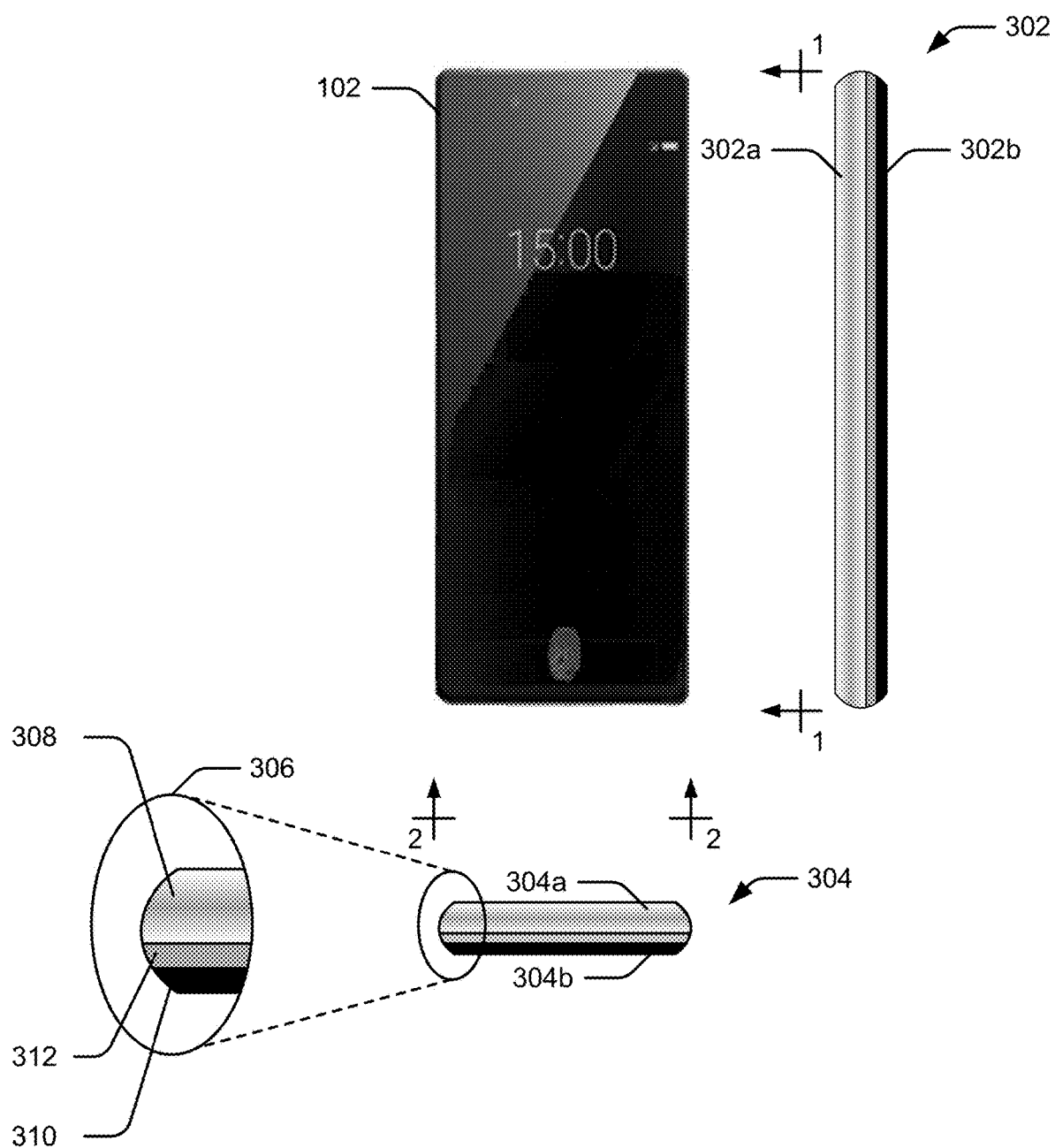
FIG. 3 illustrates side views of an example mobile device in accordance with one or more embodiments.

Consider now FIG. 3 which illustrates side views of computing device 102 of FIG. 1 that includes a touchscreen display. Here, the touchscreen display of computing device 102 has a flat and smooth surface without any apertures created to house or expose mechanical buttons. For instance, instead of exposing a fingerprint scanner through an aperture in the touchscreen display, computing device 102 places the corresponding sensor under the touchscreen display. To initiate a fingerprint scan, the user places their finger at a location on the touchscreen display positioned over the scanner. However, in addition to having a flat and smooth surface (without exposed openings), the touchscreen display extends to wrap around the corresponding edges of computing device 102.

Side view 302, which runs vertically along line 1-1, corresponds to the right-facing edge of computing device 102, but can alternately correspond to the left-facing edge of computing device 102. In a similar manner, side view 304, which runs horizontally along line 2-2, corresponds to the bottom edge of computing device 102, but can alternately correspond to the top edge. To provide a frame of reference, the corresponding arrows point to the front of computing device 102 for each side view. Thus, for side view 302, the left-most partition 302*a* corresponds to the front of computing device 102 (where the touchscreen display resides), and the right-most partition 302*b* corresponds to the back of computing device 102. Similarly, for side view 304, the top partition 304*a* corresponds to the front of computing device and the bottom partition 304*b* corresponds to the back of computing device. For clarity, image 306 magnifies a portion of side view 304.

As seen within image 306, touchscreen display 308 wraps around the front of computing device 102 and over the edge to extend downward and cover a portion of the side of computing device 102. In image 306, touchscreen display 308 extends a length of approximately halfway down the side of computing device 102. However, this is merely for discussion purposes, and alternate lengths can be used without departing from the scope of the claimed subject matter. At some point, the touchscreen display connects with housing component 310 and the two are sealed together by a band 312. This can be achieved in any suitable manner, such as by using a clamping device, using an adhesive, using a shrinkable material, and so forth. By extending the touch input capacitance of the computing device via the extension of the touchscreen display, computing device 102 can identify various grip characteristics associated with a user, and modify the visual placement of virtual control buttons based upon these various grip characteristics.

Figure 4:
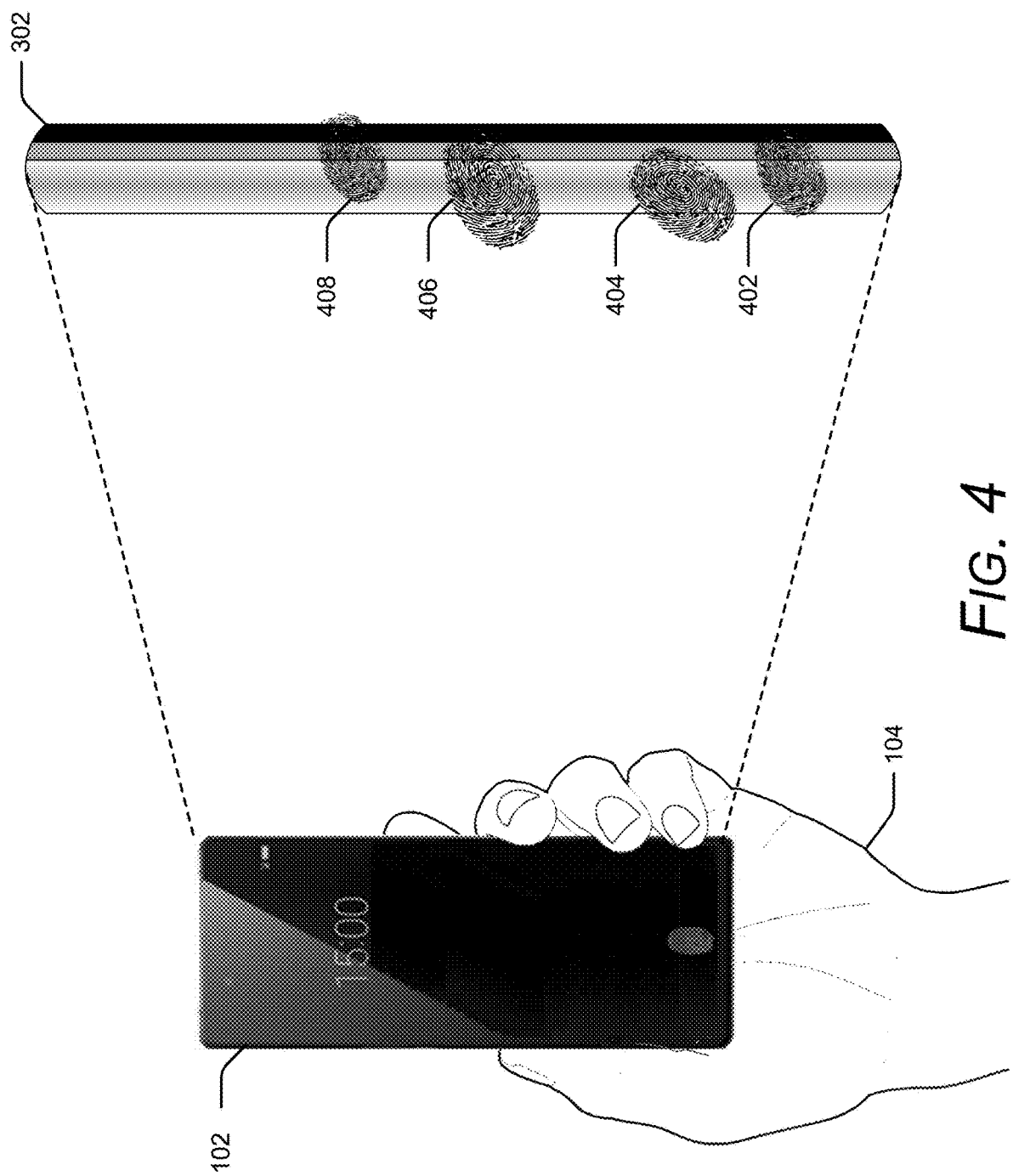
FIG. 4 illustrates an example of identifying a grip profile in accordance with one or more embodiments.

To further illustrate, consider FIG. 4 which includes computing device 102 and hand 104 of FIG. 1, and side view 302 of FIG. 3. For clarity, side view 302 has been enlarged to a larger scale relative to computing device 102. As can be seen, computing device 102 is being held or gripped by hand 104 such that several fingers of hand 104 are in contact with the wrapped extension of the touchscreen display. Here, various fingerprints are positioned at locations that corresponding to locations 106b-106e of FIG. 1. For instance, fingerprint 402 corresponds to the little finger of hand 104 making contact with the touchscreen display at location 106e, fingerprint 404 corresponds to the ring finger making contact at location 106e, fingerprint 406 corresponds to the middle finger making contact at location 106c, and fingerprint 408 corresponds to the index finger making contact at location 106b. While not illustrated here, the thumb of hand 104 has a similar contact location on the opposite side.

Since each finger has a different size and position relative to one another, each respective fingerprint has respective characteristics that are identifiable when they contact the touchscreen display. For example, each fingerprint makes contact at a different location, with a different surface contact size, as well as a different surface contact shape. Because of this, and based on the input received by the touchscreen display, computing device 102 can discern a respective location for each finger and the respective spacing between the fingers. To identify which hand is currently holding the device, computing device 102 can identify the number of contact points on each side. Here, computing device 102 is being held by the left hand of a user, which is determinable by identifying the three to four fingerprints contacting the touchscreen display in side view 302, and the one thumb print gripping the opposite side of computing device 102 (not illustrated here).

Computing device 102 can also determine when a particular finger is used to interact with the touchscreen display. For example, consider fingerprint 408. For this particular fingerprint, only the upper portion of the fingerprint is in contact with the touchscreen display. Using relative positioning and number of contact points on side view 302, computing device 102 can determine that fingerprint 408 corresponds to the index finger of a user grip. However, computing device 102 can determine other characteristics, such as a surface area or size of that finger and/or an angle at which the finger is turned. In turn, these characteristics can be used to identify when the user selects or interacts with the touchscreen display at other locations with the index finger. The size, distance, and or location of the respective fingerprints can be analyzed to determine a hand length corresponding to the grip. After determining the various characteristics (via input from the wrapped extension of the touchscreen display), some embodiments store the information in a grip profile as further described herein.

Figure 5:
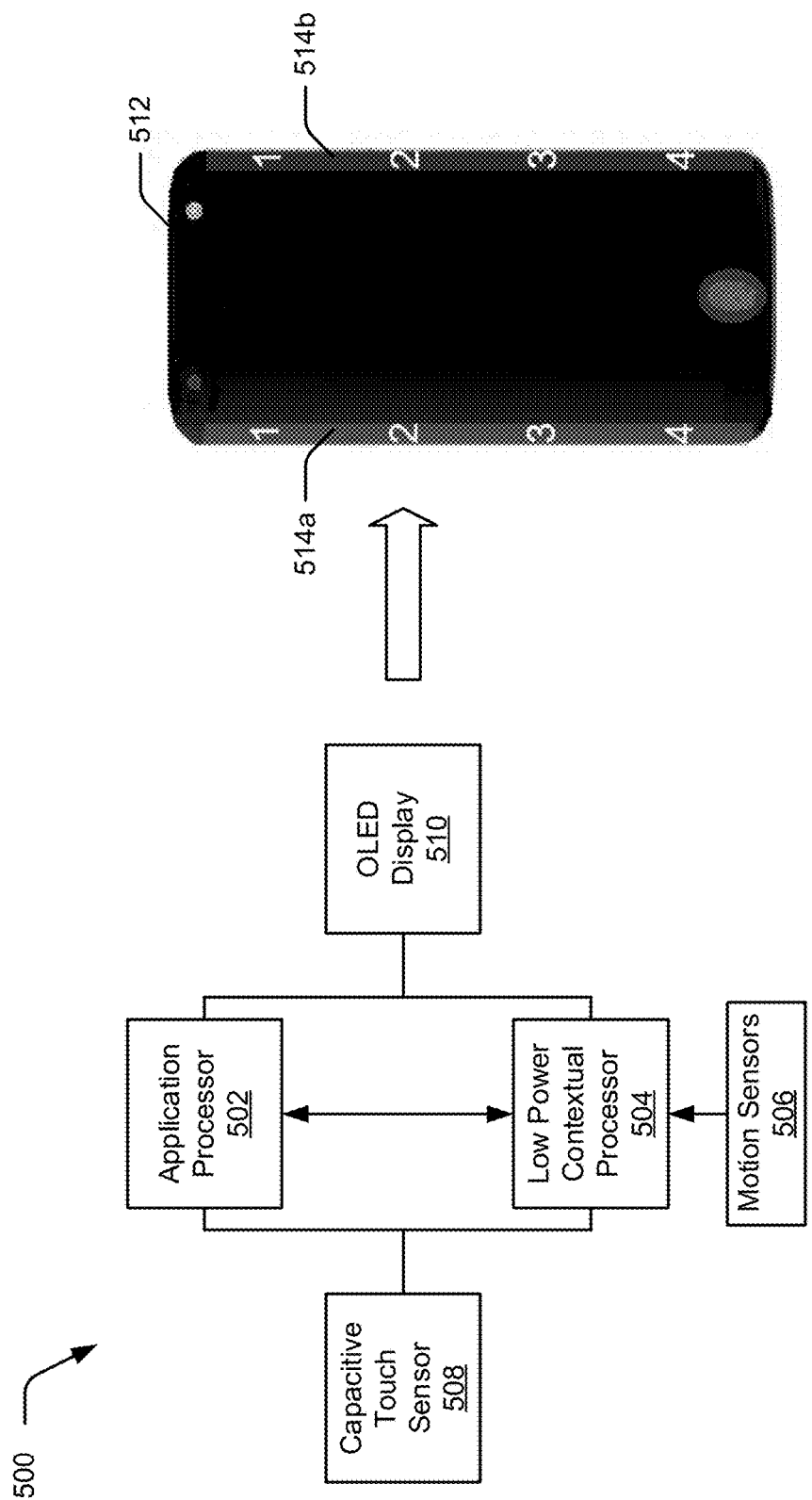
FIG. 5 illustrates an example architecture used in an example mobile device in accordance with one or more embodiments.

FIG. 5 illustrates a non-limiting example architecture 500 that can be used to implement detecting a grip profile, as well as locating virtual control buttons based upon the grip profile. It is to be appreciated that this example architecture has been simplified for discussion purposes, and can include other or alternate components not identified here. Among other things, architecture 500 includes application processor 502 and low power contextual processor 504 that have an ability to share data with one another. Application processor 502 can be used to execute processor-executable instructions associated with various applications and/or operating system functionality, while low power contextual processor 504 can be used to for contextual computing. Here, contextual computing indicates processing associated with sensors, such as motion sensors 506 and capacitive touch sensor 508. In some cases, low power contextual processor 504 processes input provide by these varying sensors, and forwards or communicates data based on this input to application processor 502. As indicated by its name, motion sensors 506 detect motion relating to a computing device, such as by way of a gyroscope, an accelerometer, and so forth. Capacitive touch sensor 508 provides touch input capabilities, such as by way of a touchscreen device.

In this example, architecture 500 includes an organic light-emitting diode (OLED) display 510 that can be used to display graphics. However, other types of displays can be utilized as well. With respect to computing device 512, OLED display 510 provides a visual user interface such that computing device 512 is able to display output to a user. In some embodiments, computing device 512 is representative of computing device 102 of FIG. 1, and includes OLED display 510 as a bezel-less display. Because computing device 512 incorporates OLED display 510 as a bezel-less display, some embodiments configure portions of the display as side-rails used to display virtual control buttons. For instance, side-rail 514a (which is left-facing) corresponds to a right-hand side-rail (i.e. held by the right hand) of the computing device and side-rail 514b (which is right-facing) corresponds to a left-hand side-rail (i.e. held by the left hand). Each side-rail has been additionally partitioned into four respective quadrants. Thus, a first virtual control button may be visually displayed (and located) at quadrant 1 of side-rail 514b, a second virtual control button may be visually displayed (and located) at quadrant 4 of side-rail 514b, and so forth. Being portions of the OLED display, the content displayed in each quadrant of the side-rails (e.g., virtual control buttons) can change as different hardware and/or applications have priority. Thus, architecture 500 allows for the reuse of side-rails to display different virtual control buttons. While computing device 512 illustrates a left-hand side-rail and a right-hand side-rail, other embodiments include a top side-rail and/or a bottom side-rail.

Having described the detection of a grip profile, consider now a discussion of virtual control button placement based upon a grip profile in accordance with one or more embodiments.

Virtual Control Button Placement Based Upon a Grip Profile

Once a grip profile has been determined, some embodiments visually move virtual control buttons based upon the grip profile. To illustrate, consider FIGS. 6a and 6b which illustrate an example environment at different points in time in which a virtual control button is voice-activated. FIG. 6a includes environment 600a (which represents the example environment at a first point in time), while FIG. 6b includes environment 600b (which represents the example environment at a second point in time).

In FIG. 6a, computing device 102 has powered up and is in an idle state without user interaction. In this particular example, computing device 102 displays a virtual control button at an initial location 602 that is positioned in the upper-right-facing corner of computing device 102. Here, the virtual control button takes the form of a power button (in lieu of a mechanical button) that can be activated by the user to partially or fully power down (or power up) computing device 102. The initial location of the virtual control button can be determined in any suitable fashion, such as through a manufacturing default location or a user preference location. Alternately or additionally, location 602 can be based upon a type of control associated with the virtual control button (e.g., a power control, a volume control, an image capture control, and so forth).

Continuing on to FIG. 6b, computing device has transitioned from a state with no user interaction to a state in which hand 104 is gripping the device. Since computing device 102 has an extended touchscreen display that wraps around its edges, the user may enter input into the device through the corresponding grip in contact with the wrap-around edges. In turn, computing device 102 not only identifies that there is input, but it also determines a grip profile from the input. Determining the grip profile can include identifying a current grip in contact with the device, identifying respective characteristics of each finger in contact with the touchscreen display, and/or mapping the current grip to a known grip profile as a way to identify user preferences. For instance, after determining characteristics about the current grip, computing device 102 can then match the current grip with a stored grip profile. When a matching grip profile is located, computing device 102 can determine and/or base placement of the power control button by extracting and obtaining user preferences stored with the grip profile (e.g., at a thumb location, at a location on a particular side, at a location based upon which hand is gripping the computing device, and so forth). Regardless how the location is determined, the virtual control button visually moves from an upper-right-facing corner of computing device 102 to a lower-left facing side corresponding to the thumb at location 604.

Some embodiments visually alter an appearance of a virtual control button. For example, when computing device 102 determines that a grip profile exists for a current grip in contact with the device, user preferences stored with the grip profile can be used to alter not only the visual location of where the virtual button is displayed, but a visual appearance of the virtual control button as well. Here, the virtual control button has been enlarged relative to its originally displayed size. However, other types of visual alterations can be applied as well. In some cases, the visual alteration changes which symbol or image is displayed for the virtual control button. In other cases, the visual alteration can also change a type of control interface associated with the virtual control button. For example, consider a case in which a virtual control button corresponds to a volume control button of a speaker. By default, the volume control button has a shape of a turn knob, where a user can increase or decrease the speaker volume by performing an arching sweep to the right or left around the turn knob. Some embodiments allow a user to modify the virtual control button to not only have a different visual appearance, but user interface as well. For example, the user can change the volume control button from the knob control to a slider bar control. Accordingly, this user preference can be stored with a grip profile such that each time computing device 102 identifies the user's grip, it applies the volume control user preference to the virtual control button. While described in the context of user preferences being stored with a grip profile, and subsequently applied when a grip profile is identified, other embodiments apply user preferences to virtual control buttons independent of whether a grip profile is identified or not.

Figure 7B:
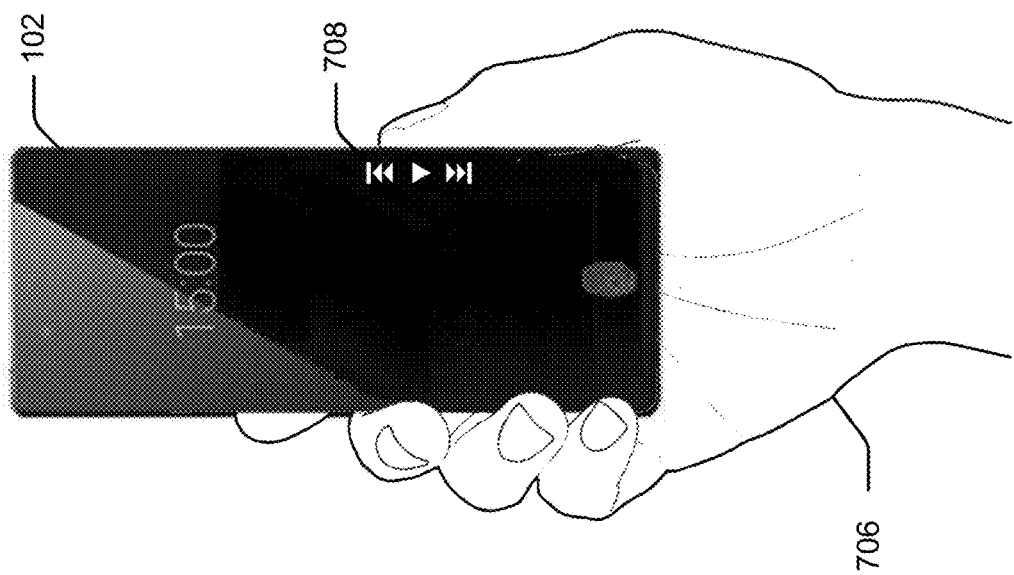
FIGS. 7a and 7b illustrate an example of visually moving a virtual control button in accordance with one or more embodiments.
Figure 7A:
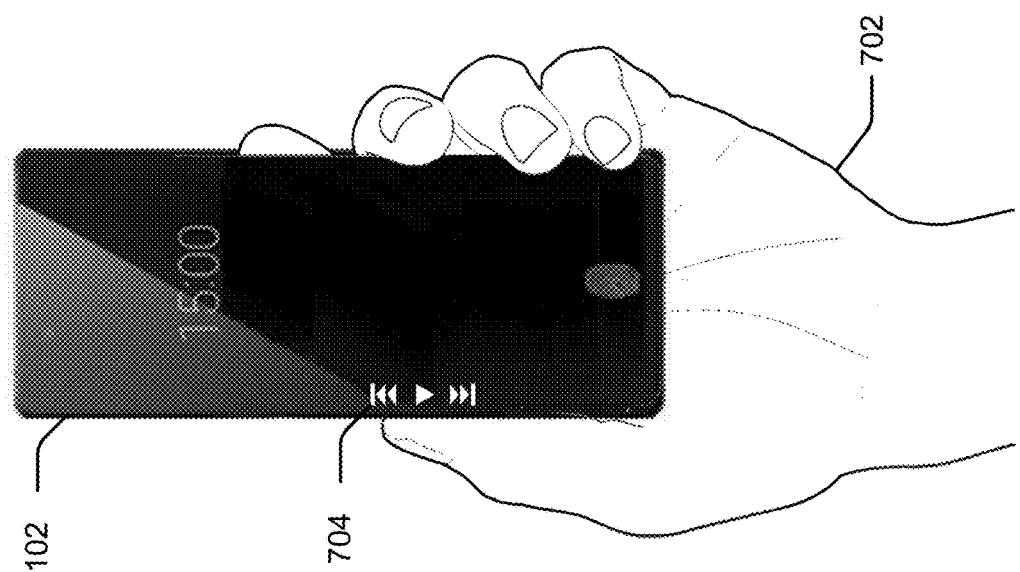

As another example, FIGS. 7a and 7b illustrate visually moving a virtual control button, and/or placement of the virtual control button, based upon an identified hand. In FIG. 7a, computing device 102 is held by left hand 702 and displays playback controls at a location 704 that is positioned near the thumb of the identified grip. Location 704 can be based on any suitable information, such as stored statistics that indicate the current grip utilizes the thumb more than other fingers, the thumb was the last known finger used to enter input, a user preference to position the playback controls at a thumb location, and so forth. Continuing on to FIG. 7b, the user has switched from holding computing device 102 with left hand 702 to holding computing device 102 with right hand 706. Accordingly, and based upon input received via the wrap-around touchscreen edges, computing device 102 has determined a switch in the current grip. More particularly, computing device 102 has determined that the user has switched from holding the device in their left hand to their right hand. Some embodiments mirror the placement of virtual control buttons based upon identifying which hand grips the computing device. Here, computing device 102 visually moves the playback controls to a mirror location 708. Mirror location 708 can be directly opposite of location 704, or can mirror the user preference of being position at a thumb location. Thus, some embodiments can mirror the placement of virtual control buttons based upon a detected hand (e.g., right hand, left hand).

Figure 8:
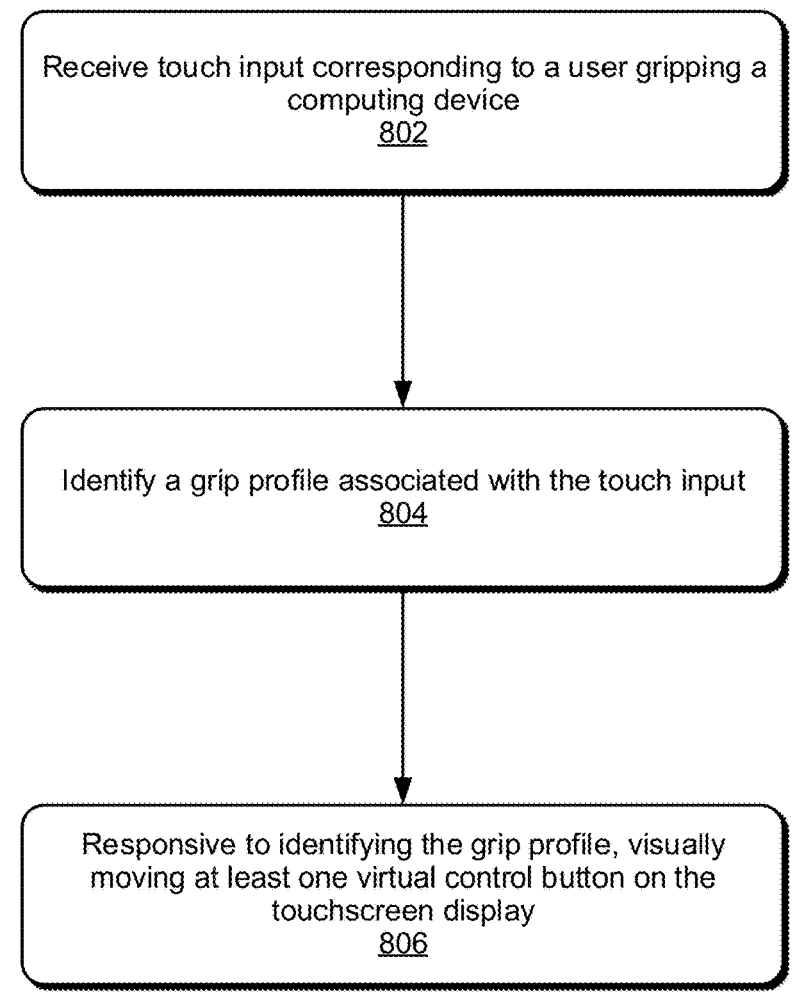
FIG. 8 is a flow diagram that illustrates operations of moving a virtual control button in accordance with one or more embodiments.

FIG. 8 illustrates an example method 800 that employs visually placing or moving virtual control buttons in accordance with one or more embodiments. Generally, any services, components, modules, methods, and/or operations described herein can be implemented using software, firmware, hardware (e.g., fixed logic circuitry), manual processing, or any combination thereof. For instance, portions or all of method 800 can be performed by varying combinations of touch input analysis module 110, grip profile database 112, voice recognition module 114, and/or control placement module 116 of FIG. 1. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. While method 800 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 802 touch input corresponding to a user gripping a computing device is received. For example, the computing device can include a touchscreen display that extends or wraps around the edges of the computing device. In turn, as a user grips portions of the wrap-around edges, the touchscreen display generates touch input that corresponds the various digits or fingers in contact with the touchscreen display.

Responsive to receiving touch input, a grip profile associated with the touch input is identified at block 804. In some embodiments, identifying the grip profile corresponds to identifying respective characteristics about each finger or digit of a current grip associated with the touch input. These characteristics can include finger surface area in contact with the touchscreen display, distance between respective fingers, a corresponding hand length, a right hand identification, specific finger identification, and so forth. Alternately or additionally, identifying the grip profile can include mapping the current grip to a known grip profile stored in a grip profile database. Mapping the current grip to the known grip profile can include identifying an exact match of certain characteristics between the grip profiles, or can include identifying characteristics between the grip profile that are within an acceptable difference range. If no stored grip profile maps to the current grip (e.g., the current grip is unknown), some embodiments create a new grip profile in the database and store the various identified characteristics in the new grip profile.

Responsive to identifying the grip profile, at least one virtual control button on the touchscreen display is visually placed or moved at block 806. In some embodiments, the virtual control button can be initially visually placed based on the grip profile. In other embodiments, the virtual control button is moved from an initial or default location to a new location based upon the grip profile. This can include determining the new location based upon user preferences associated with the grip profile, based upon a hand length corresponding to the grip profile, based upon statistics of most frequently used fingers in the grip profile, based upon a changed grip profile, and so forth.

Virtual control buttons help the manufacturing process of a computing device by reducing expenses associated with including mechanical buttons by excluding mechanical buttons. An added benefit to virtual control buttons is the ability to optimally place the virtual buttons based upon a user's grip. With mechanical buttons, the fixed nature of these buttons generate a configuration not suited for all hand types. For instance, users with large fingers may find it difficult to press smaller mechanical buttons due to the inability to optimally place their finger on the proper activation point. As another example, users with small fingers and/or a smaller hand length may find it difficult to press two mechanical buttons simultaneously because the span between the two mechanical buttons is too great for their hand. This can not only cause a strain to the user, but can cause the user to reposition their grip or inaccurately activate the buttons. By basing the placement of virtual control buttons on a user's grip, the virtual control buttons can be optimally placed for individual users, thus improving the user's experience in interacting with a device.

Having described virtual control button placement based upon a grip profile, consider now a discussion of contextual placement of virtual control buttons in accordance with one or more embodiments.

Contextual Placement of Virtual Control Buttons

Various embodiments visually display a virtual control button at a location based upon a grip profile. For instance, when a user grips a mobile device with a touchscreen display that wraps around the edges of the mobile device, the mobile device can identify various characteristics about the grip, such as a location corresponding to a thumb in the grip. In turn, the mobile device can visually display a virtual control button at a position corresponding to the thumb. Selecting the thumb for positioning of the virtual control button can be based upon a user preference, a default configuration parameter, and so forth. However, other contexts can be used to identify not only where to display a virtual control button, but when to display it.

Consider an example in which a user configures a computing device (e.g., mobile phone or tablet) as a control device for a home security system and/or a home media system. In some embodiments, the computing device can identify when it has moved into (or out of) a close proximity to these systems. For example, when the user transports a mobile phone to a work environment, the mobile phone can identify that these systems are not in a same location as the mobile device. This can be based upon any suitable metric, such as a identifying the mobile device is no longer within a predetermined distance to the system based up GPS location information, an inability to establish a communication link with the systems over a local network, and so forth. Upon the user returning home, the mobile phone then identifies that the systems are at the same location as the mobile device. In some embodiments, when the mobile device detects a particular system or device is at the same location as the mobile device, or within a predetermined distance to the mobile device, the mobile device automatically displays a virtual control button corresponding to the detected device. For instance, in the case of a home security system, the mobile device can display a virtual control button associated with disarming the home security system. The display location can be determined in any suitable manner, such as based on a current grip in contact with the mobile device, through a user preference, and so forth. As another example, the mobile device can identify when it has moved within a predetermined distance of a frequently visited restaurant. In turn, the mobile device can then display a virtual control button associated with calling the restaurant to help the user make reservations and/or order to-go items. Thus, some embodiments can use a location context (e.g., a device is within a predetermined distance from a particular location or system) to trigger the display of a virtual control button.

Some embodiments display virtual control buttons based upon the context of a priority associated with a functionality. Consider a mobile phone where the user is listening to music via an audio playback mechanism. In this scenario, the audio playback mechanism has a virtual control button positioned on a particular quadrant of a side-rail that corresponds to a thumb that is in contact with the smart phone. As the user is listening to playback audio, the mobile phone receives an incoming call request. Here, the incoming call request has priority over the audio playback. Accordingly, some embodiments remove the lower priority virtual control button (e.g., the audio playback control button), and replace it with a higher priority virtual control button (e.g., one associated with managing an incoming call request). In other words, a call management control button replaces the audio playback control button at the particular quadrant of the side-rail.

As another example, the display of virtual control buttons can be switched based upon a context of which applications have focus. Consider an example where the user is viewing Internet content via an Internet browser and receives an email message during the viewing session. As the user switches from the Internet browser to an email client, some embodiments remove a virtual control button corresponding to the Internet browser from the touchscreen display, and replace it with a virtual control button that corresponds to the email client.

In some embodiments, instead of or in addition to displaying virtual control buttons based upon a context, a computing device can remove all virtual control buttons. For example, consider a case in which a user has removed their grip from the computing device. In such a scenario, the computing device can identify when the user no longer interacts with the virtual control buttons. Thus, the computing device identifies a context corresponding to no user interaction. Identifying this context can prompt the computing device to remove any visible virtual control buttons from the display for purposes including security, power saving, and so forth. The computing device can monitor interaction with the touchscreen display and, upon detecting no user interaction after a predetermined amount of time, remove some or all of the virtual control buttons from the display. The predetermined amount of time can be a default amount of time and/or or a user-configurable amount of time.

Displaying (or removing) virtual control buttons based upon a context allows a computing device to dynamically alter what buttons are displayed based upon an assessment of what might be more useful to the user. By determining a location context of the user and/or computing device, which applications are currently in focus, which functionality has priority, which other devices are in proximity to the computing device, and so forth, the computing device can provide the user with virtual control buttons that are more relevant to a current situation or scenario. This can help reduce the number of interactions the user navigates through to find a corresponding control button, and improve the user experience.

Having described virtual control button placement based upon context, consider now a discussion of a user configurable virtual control buttons in accordance with one or more embodiments.

User-Configurable Virtual Control Buttons

Virtual control buttons allow a computing device to modify or adjust the placement of control buttons based upon various characteristics of a user's hand, such as hand length, finger size, the span between fingers, respective finger in contact with the computing device, and so forth. While grip profiles can be used to determine locations in which to place the virtual control buttons, sometimes a user may have different preferences unknown to the computing device. Various embodiments provide the user with an ability to customize the virtual control buttons and/or add user preferences. For instance, a user can resize and/or change a type of control interface associated with the virtual control button as further described herein. Alternately or additionally, the user can reposition the virtual control button at a different location on the touchscreen display.

Figure 9A:
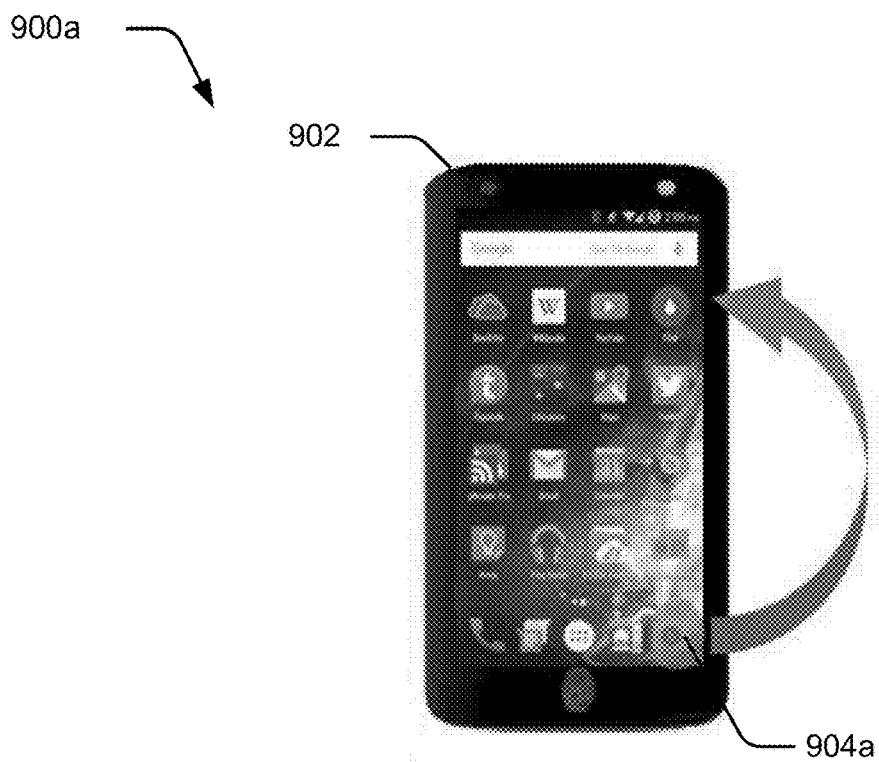
FIGS. 9a-9c illustrate an example of a user configurable interface in accordance with one or more embodiments.
Figure 9B:
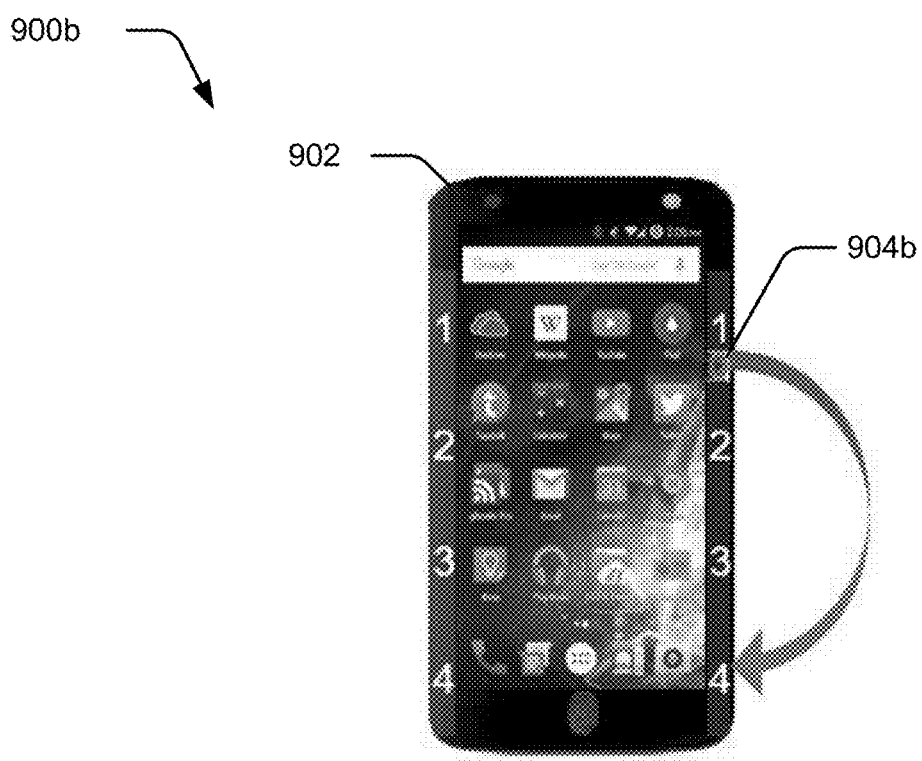
Figure 9C:
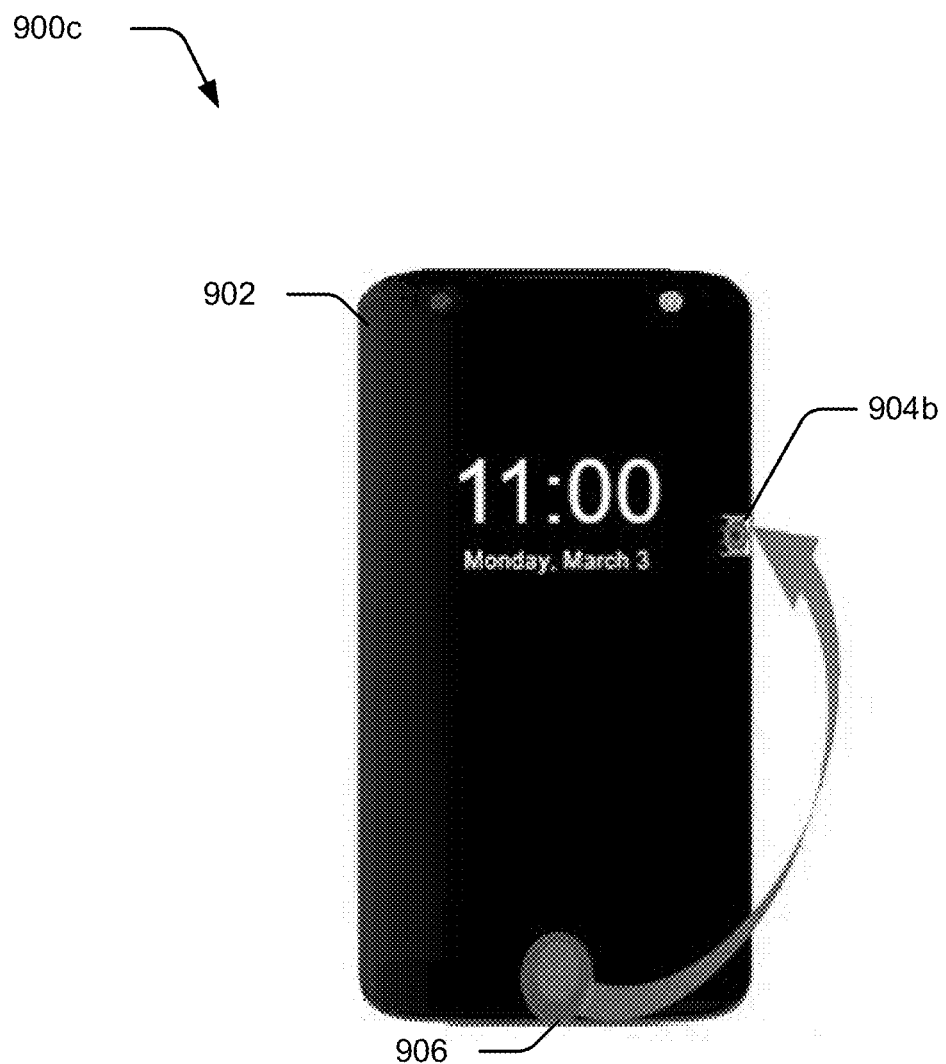

FIGS. 9a, 9b, and 9c illustrate an example environment at varying points in time. FIG. 9a illustrates an environment 900a at a first point in time, FIG. 9b illustrates an environment 900b at a second point in time, and FIG. 9c illustrates an environment 900c at a third point in time. Each of these environments includes computing device 902 at these varying points in time.

In FIG. 9a, computing device 902 displays various icons and virtual control buttons on a corresponding touchscreen display. Included in this display is virtual control button 904a, which is positioned at the lower-right-facing corner of the touchscreen device. For this example, virtual control button 904a controls an aspect of a camera, such as an autofocus feature, an image capture trigger, and so forth. However, the virtual control button can correspond to other types of hardware and/or applications without departing from the scope of the claimed subject matter. The positioning of virtual control button 904a may make it difficult for some users to interact with the camera, or reduce the user's likelihood of capturing a still image that is in focus. Thus, the user may desire to customize its positioning to a different location.

FIG. 9b illustrates computing device 902 at second point in time, where the user has customized the user interface and/or moved virtual control button 904b to quadrant 1 of the right-facing side-rail of computing device 902. This can be done in any suitable manner, such as through a drag-and-drop touch input. Here, the user interface displays both virtual control button 904a and virtual control button 904b, but in other embodiments, positioning of virtual control button 904b on any of the quadrants of either side-rail causes the removal of virtual control button 904a. Once the user modifies the virtual control buttons, the customization can be saved in a corresponding user profile for future usage. In some embodiments, the user customization is stored as part of a grip profile in grip profile database 112 of FIG. 1. In turn, when the grip profile is subsequently identified, the user customization pertaining to virtual control button 904b can be applied for display on the corresponding touchscreen interface. Alternately or additionally, computing device 902 stores the user customization information with a user profile, such as a user profile associated with a fingerprint authorization. In such a scenario, some embodiments display the user customization with respect to virtual control button 904b when the user subsequently unlocks or logs onto computing device 902, such as through fingerprint authentication via a sensor, and independent of whether a current grip is in contact with the computing device.

In order to track which virtual control buttons are currently available, some embodiments provide the user with a mechanism to invoke or display the various customized and/or available virtual buttons. FIG. 9c illustrates the computing device at a third point in time that is later than those illustrated in FIGS. 9a and 9b. Here, computing device 902 is in an idle state since the user has not interacted with the computing device for a predetermined amount of time. As part of being in the idle state, computing device 902 has removed the various virtual control buttons and icons displayed previously. In some embodiments, when a user desires to see which virtual control buttons are available, they can interact with the touchscreen display, such as tapping the touchscreen display at a location 906 that is positioned over a fingerprint sensor. In response to receiving this input, computing device 902 displays virtual control button 904b as customized by the user.

Having described a customizable user interface that includes virtual control buttons, consider now haptic feedback for virtual control buttons in accordance with one or more embodiments.

Sensory Feedback on Virtual Control Button Activation

When a user activates a mechanical button, the mechanical button typically gives feedback to the user indicating the button has been successfully pressed. For example, some mechanical buttons produce an audible sound when pressed, such as a click. In turn, when the user hears the click, they are assured that the mechanical button has been successfully activated. As another example, some mechanical buttons physically move when pressed, such as in a direction that corresponds to the pressing movement (e.g., downward into a device). This movement provides another form of feedback to the user that the button has been successfully activated. Virtual control buttons, on the other hand, can be activated by a user touching a corresponding location on a touchscreen. However, such a scenario lacks the audio or physical feedback that assures the user the virtual control button has been activated.

In some embodiments, a computing device with virtual control buttons provides feedback to a user that a corresponding virtual control button has been activated. For example, some embodiments can include an audio clip that the computing device plays back upon activation of a virtual control button, such as an audio excerpt of a clicking sound, similar to that generated by mechanical button, a beep, a chirp, and so forth. Alternately or additionally, the computing device can incorporate haptic devices to provide physical feedback, such as a vibration or motion that is detectable by a user. Surface haptics can be incorporated into the touchscreen display at various locations such that a motion-based haptic is delivered to the user when touch input is received at a particular location that corresponds to a virtual control button.

Figure 10:
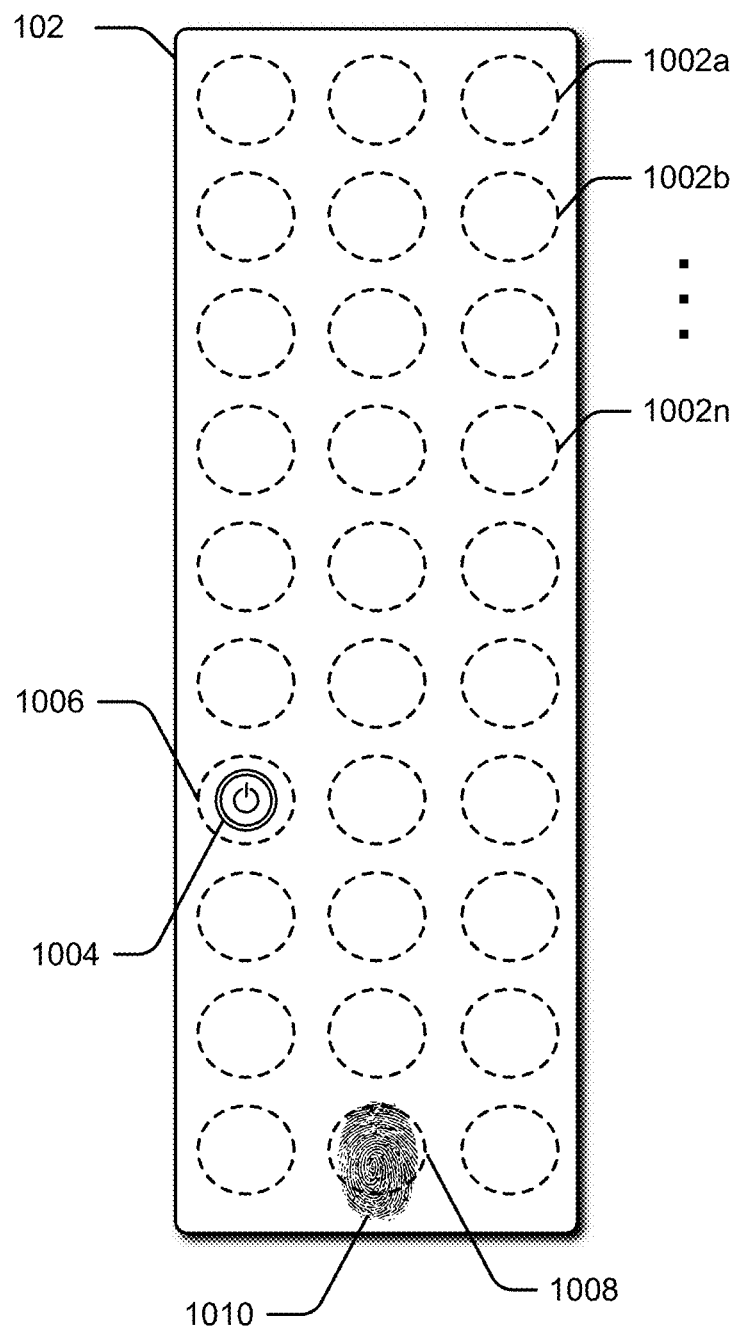
FIG. 10 illustrates an example of haptic sensor placement in accordance with one or more embodiments.

To further illustrate, consider FIG. 10 that illustrates a shadow outline of computing device 102 of FIG. 1. Here, computing device 102 includes multiple haptic sensor components labeled here as haptic sensor 1002a, haptic sensor 1002b, to haptic sensor 1002n, respectively, where n is an arbitrary number. For simplicity's sake, the haptic sensors are arranged in a 3×10 rectangular matrix, but other embodiments can utilize other shapes and numbers of haptic sensor components without departing from the scope of the claimed subject matter. Each haptic sensor can serve as both a sensor actuator or output component such that the haptic sensor can detect input (e.g., pressure) and deliver output (e.g., movement or vibration). Here, the circular outline of a respective haptic sensor indicates a region of a touchscreen display (such as touchscreen display 108 of FIG. 1) over which haptic sensing is possible for that respective haptic sensor component, and/or the region over which the respective haptic sensor provides haptic feedback.

In this example, computing device 102 is displaying a power control button 1004 at a location corresponding to a thumb position of a current grip in contact with computing device 102. Note, too, that the positioning of the power control button 1004 corresponds to a region of haptic sensor 1006. For discussion purposes, haptic sensor 1006 has been given the designator of 1006, but it is to be appreciated that it can be considered as part of the multiple haptic sensors components that have been generically referred to with "1002" designators. When a user activates the power control button 1004, such as through contact with the touchscreen display at that location, haptic sensor 1006 can identify this interaction and deliver a haptic sensory output, such as a vibration. In some embodiments, the input generated by the touchscreen display activates haptic sensor 1006. In other embodiments, haptic sensor 1006 senses pressure as the user touches the touchscreen display, and uses this pressure detection to identify the user interaction, and subsequently deliver the haptic sensory output As another example, haptic sensor 1008 corresponds to a region over which a user can enter a fingerprint for scanning. As in the case of haptic sensor 1006, haptic sensor 1008 has been given the designator of 1008 for discussion purposes, but can be considered as part of the multiple haptic sensors components that have been generically referred to with "1002" designators. As the user places fingerprint 1010 over the corresponding region, haptic sensor 1008 can deliver the haptic sensory output to the user indicating that the fingerprint scan has been detected.

Having described haptic feedback for virtual control buttons, consider now a discussion of a virtual control buttons corresponding to modular attachments in accordance with one or more embodiments.

Virtual Control Buttons for Modular Attachments

Computing devices, such as mobile devices like smart phones, provide various functionality to a user in a hand-held device. For example, smart phones allow a user to access various web pages over the Internet, take images via a camera, and so forth. However, a user may sometimes desire the capability to add on functionality to an existing computing device without upgrading to a new device. Various embodiments provide this extra functionality through the use of modular attachments.

A modular attachment is a device that mounts or attaches to a computing device, such as a mobile phone device. The modular attachment is communicatively linked to components of the computing device phone by way of a suitable interface, such as a hardware interface. An example modular attachment is illustrated in FIGS. 11a and 11b.

Figure 11A:
FIGS. 11a and 11b illustrate example virtual control buttons associated with a modular attachment in accordance with one or more embodiments.
Figure 11B:
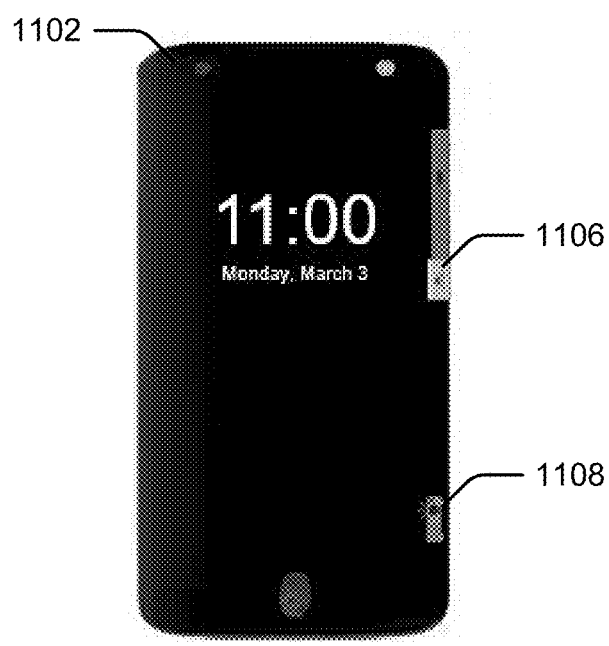

FIGS. 11a and 11b illustrate a back view and a front view, respectively, of computing device 1102. In some embodiments, the computing device of FIGS. 11a and 11b is computing device 102 of FIG. 1.

FIG. 11a also includes modular attachment 1104, which is illustrated here in the form of an add-on projection system. For instance, a user can mount modular attachment 1104 to computing device 1102 in order to project images, video, and/or audio outward from the mobile phone device in order to enable viewing of the media by a larger audience. Such a modular attachment can mount to the computing device using strong magnetic coupling elements (not illustrated). However, other types of hardware coupling devices can be used. A hardware interface (not visible here) between the modular attachment 1104 and computing device 1102 enables information and data to be exchanged between the two devices. For example, a user can download or stream a video using an Internet connection via computing device 1102. In turn, information and data associated with the video can be conveyed to modular attachment 1104 by way of the hardware interface to be subsequently projected.

As in the case of computing device 102 of FIG. 1, manufacturers of modular attachments desire to reduce the manufacturing costs associated with producing a modular attachment and/or reduce sources of failure within the modular attachment. Accordingly, various embodiments provide virtual control buttons for modular attachments. Upon establishing a communication link with a computing device, a modular attachment can register virtual control buttons with the computing device. Using virtual control buttons allows the modular attachment to modify, replace, and/or eliminate virtual buttons without necessitating hardware changes to the modular attachment, or the computing device. In turn, this makes making updates or changes to user interfaces associated with the modular attachment a matter of simply updating the corresponding software and/or firmware of the modular attachment. With respect to the attached computing device, these changes can be trivial with little to no impact to the computing device, since the changes are rippled through the already established registration process.

In FIG. 11b, modular attachment 1104 has registered two virtual control buttons with computing device 1102: volume control button 1106 and projection control button 1108. In this example, volume control button 1106 controls the sound level that is projected by modular attachment 1104, while projection control button 1108 toggles the corresponding display camera of modular attachment 1104 on and off. When modular attachment 1104 is properly mounted to the computing device such that the two devices can exchange information, computing device 1102 displays the virtual control buttons. Similarly, when modular attachment is removed, computing device 1102 removes the virtual control buttons from its display. Here, computing device 1102 displays the virtual control buttons in different quadrants of the left-hand side rail of the touchscreen display. Since volume control button 1106 and projection control button 1108 are virtual control buttons, the user has the ability to customize both as further described herein. For instance, the user can move volume control button 1106 to be closer to projection control button 1108, can modify the visual size of either button, and/or can change the control interface(s). Alternately or additionally, computing device 1102 can position volume control button 1106 and/or projection control button 1108 based upon a grip profile or stored user preferences. In this manner, a user can interface with the touchscreen display of computing device 1102 to activate virtual control buttons corresponding to the modular attachment as a way to control the behavior of the modular attachment.

Figure 12:
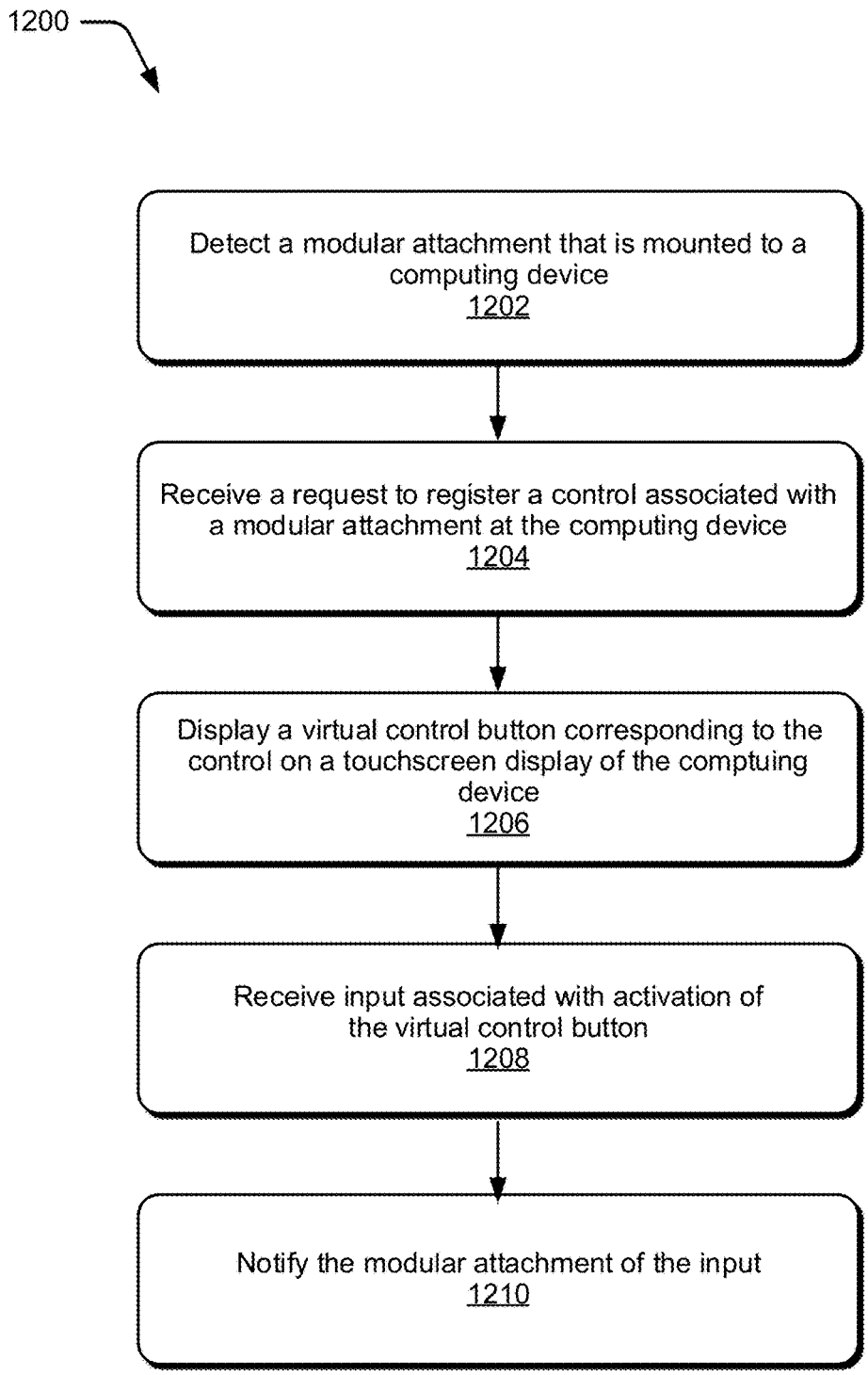
FIG. 12 is a flow diagram that illustrates operations of displaying virtual control buttons associated with a modular attachment in accordance with one or more embodiments.

FIG. 12 illustrates an example method 1200 that employs modular attachment virtual control button techniques in accordance with one or more embodiments. Generally, any services, components, modules, methods, and/or operations described herein can be implemented using software, firmware, hardware (e.g., fixed logic circuitry), manual processing, or any combination thereof. For instance, portions or all of method 1200 can be performed by varying combinations of touch input analysis module 110, grip profile database 112, voice recognition module 114, and/or control placement module 116 of computing device 102 of FIG. 1. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. While method 1200 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 1202 a computing device detects a modular attachment that is mounted to the computing device. For example, when the modular attachment is properly mounted to the computing device, a communication path is established between the devices, such as through a hardware connector. When the communication path is established, the modular attachment can send the computing device a message that indicates it is present. In some embodiments, the modular attachment sends its identification information to the computing device, such as what type of functionality it incorporates, an identification name or number, and so forth.

At block 1204, a request to register a control associated with the modular attachment is received at the computing device. Alternately or additionally, the computing device can receive multiple requests, each request being associated with a respective control of the modular attachment. In some embodiments, the request to register the control includes configuration information of the control (e.g., a volume slider bar control, a volume knob control, a toggle switch control, a button control, etc.). Some embodiments of computing device include a library of controls that can be displayed such that the request from the modular attachment can indicate which control or controls from the library to display.

Responsive to receiving the request to register the control, at block 1206 a virtual control button corresponding to the control is displayed on a touchscreen display of the computing device. In some embodiments, the display of the virtual control button is based upon user preferences. For instance, the computing device can save user preferences for the modular attachment each time a user customizes a virtual control button corresponding to a control of the modular attachment. In turn, when the modular attachment is detached and then reattached at a later point, the displayed control button can be based upon these saved user preferences. Alternately or additionally, the computing device can visually display virtual control buttons for the modular attachment at locations based upon a grip profile as further described herein. This can include displaying the virtual control button at an initial or default location, and then visually moving the virtual control button to a second location that corresponds to a user's hand (e.g., a particular finger location or hand length) when a grip profile is detected.

At block 1208, the computing device receives input associated with activation of the virtual control button. For example, the touchscreen display can receive touch input at a location corresponding to the virtual control button. In turn, the computing device associates the touch input to the virtual control button and/or the modular attachment. In response to this association, the computing device notifies the modular attachment of the input at block 1210. In some embodiments, the computing device transmits an event notification through the communication path. Alternately or additionally, the computing device transmits information included in, or associated with, the input used to activate the virtual control button.

Virtual control buttons for a modular attachment can also be customized for a user. For instance, a left-handed person can customize an interface into a modular attachment by relocating the virtual control buttons from default positioning based upon right-handed access to one that is more optimal for a left-handed person. Further, modular attachment manufacturers can reduce production costs by reducing or eliminating mechanical user interface controls and incorporating virtual control buttons instead.

Having considered a discussion of virtual control buttons for modular attachments in accordance with one or more embodiments, consider now a discussion of voice activated virtual control buttons in accordance with one or more embodiments.

Voice Activation of Virtual Control Buttons

Some computing devices gate access to the functionality they provide by only allowing access to authenticated users. For example, a computing device can employ a passcode, password, or biometric authentication in order to validate or authenticate access. In turn, the user must enter a valid passcode, password, and/or enter biometric credentials (e.g., a fingerprint) into the computing device in order to gain access to the corresponding functionality. Upon gaining access to the computing device, sometimes the user navigates further to whatever functionality they desire, such as a volume control button of a playback device, an image capture control button to trigger an image capture, a contact list, and so forth. Thus, accessing the functionality of a computing device can be a multi-step process. In turn, this can cause frustration to the user when they want immediate access to a control button, but are instead delayed to access due to the various steps.

Various embodiments provide voice-activated control of virtual control buttons. In some embodiments, a computing device receives audio input, such as through a microphone. Upon receiving the audio input, the computing device identifies, through analysis of the audio input, an input command. Alternately or additionally, the computing device validates and/or authenticates access associated with the input command. Upon identifying the input command, the computing device visually displays a virtual control button on a touchscreen display. In some embodiments, the computing device displays the virtual control button at a location corresponding to a current grip in contact with the touchscreen display.

To further illustrate, consider a scenario in which a user is running and holding a mobile device in their hand in order to listen to music. While the user is running, they may desire to skip a track or turn the volume up to hear a song better. In order to activate a virtual control button corresponding to this functionality, the user can perform a series of selections and/or navigations. The user can first authenticate themselves via a fingerprint sensor to gain access to the mobile device, then navigate to a playback application. Once the playback application has the priority or focus of the mobile device, the user can then navigate to the corresponding volume control button and/or playback management control button. In order to achieve these multiple steps, a less-coordinated runner may have to stop mid-run. However, as an alternative to stopping and performing the multi-step selection process, the user can issue a verbal command to the mobile device to display a particular virtual control button.

Figure 13A:
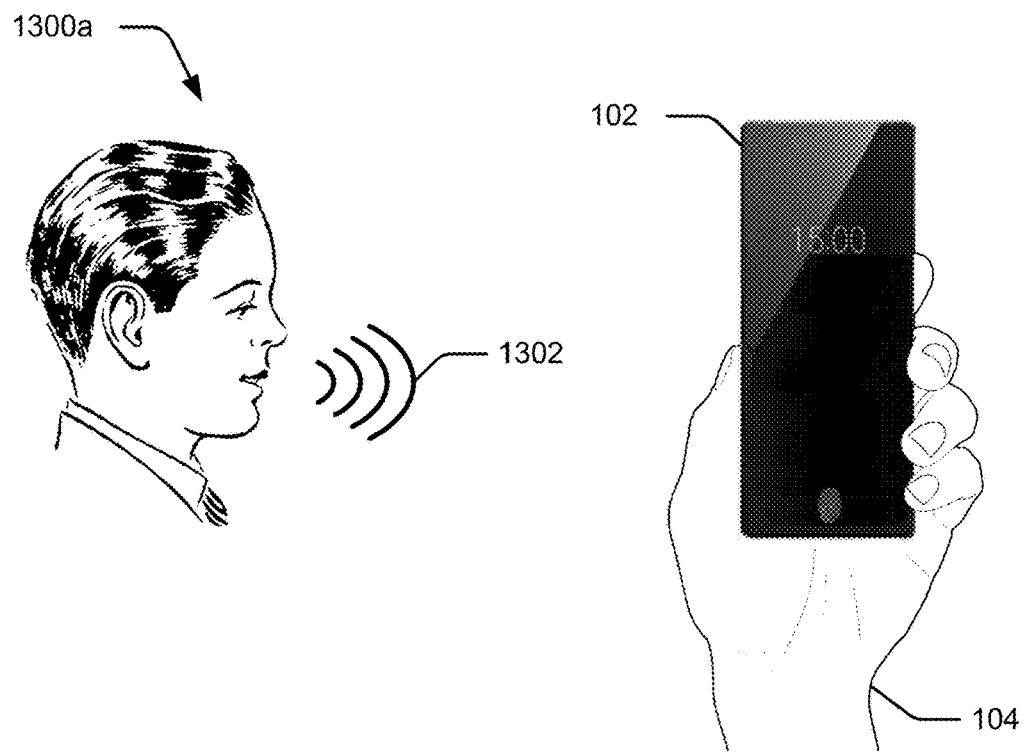
FIGS. 13a and 13b illustrate an example environment in which a computing device uses audio input to display virtual control buttons in accordance with one or more embodiments.
Figure 13B:
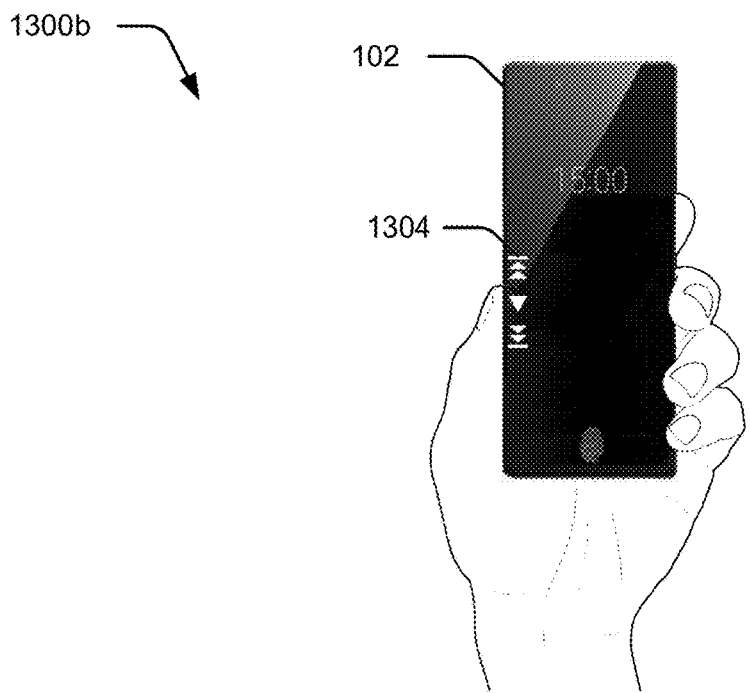

FIGS. 13a and 13b illustrate an example environment at different points in time in which a virtual control button is voice-activated. FIG. 13a includes environment 1300a at a first point in time, while FIG. 13b includes environment 1300b at a second point in time. FIG. 13a also includes computing device 102 and hand 104 of FIG. 1, where hand 104 grips computing device 102. Since the user is gripping computing device 102, a grip profile has been determined by computing device 102, such as a current grip and/or a grip profile stored in a database as described above.

At some point, the user issues a verbal command 1302 associated with accessing functionality of computing device 102. The verbal command can be any suitable type of verbal command, such as command to display a volume control button, a playback control button, a call management control button, a camera trigger control button, and so forth. In turn, computing device 102 captures audio input associated with the verbal command. The capturing process can occur in any suitable manner, such as through a hardware coupling between an audio sensor (e.g., a microphone) and an Analog-to-Digital Converter (ADC) to generate digital samples of the audio input. The computing device then processes the digital samples to analyze the audio input and identify the verbal command. However, other embodiments alternately analyze the audio input in analog form.

The analysis process uses characteristics of the audio input to identify a verbal command. For example, voice recognition module 114 of FIG. 1 can analyze the various frequency components, pitch, vibration, duration, loudness, and so forth, of the audio input, to extract and identify spoken words that are included in the audio. In some embodiments, the voice recognition module can also identify a particular user from the audio input to provide authentication. In turn, computing device 102 translates or maps the spoken words an input command. Thus, a user can verbally say "Volume Control", "Playback Control", etc., and computing device 102 recognizes this as an input command to display a volume control button.

Responsive to identifying a verbal command, computing device displays a corresponding virtual control button, as illustrated in FIG. 13b. Here, computing device 102 has determined that verbal command 1302 corresponds to displaying playback controls. Accordingly, computing device 102 displays the playback controls at location 1304 based upon a current grip in contact with computing device 102 and/or a grip profile. Here, location 1304 corresponds to a thumb of hand 104, but it is to be appreciated that the display location can be determined in any other suitable manner, examples of which are provided herein.

To provide gated access to its corresponding functionality, computing device 102 can authenticate a verbal command prior to displaying a virtual control button that corresponds to the command. In other words, computing device 102 can validate a command has authorized access to access the corresponding functionality. For instance, computing device 102 can identify a current grip in contact with the touchscreen device as a known or trusted grip associated with an authenticated user. In other words, the computing device can identify characteristics about the current grip in contact with the touchscreen display, and map the characteristics to a grip profile to verify the grip has authenticated access. Alternately or additionally, voice recognition module 114 can analyze the verbal command for access authentication, and/or use speech recognition to identify that an authenticated user has issued the command.

A user can also issue a passcode or authentication information verbally. For instance, the user can issue a first verbal command to obtain authenticated access (e.g., verbally state a password or passcode), and, upon obtaining access via the first verbal command, issue a second verbal command to display a desired virtual control button. To secure access, some embodiments of computing device 102 can put a time limit on granting access. For instance, after authenticating a user via the first verbal command, computing device 102 can trigger a timer for a predetermined time-period time such that if no second verbal command is detected in the time-period, computing device 102 gates access. Even though verbal commands can entail a multi-step process to gain access and then access the desired functionality, the verbal process simplifies the process relative to the multiple-step visual navigation and selection process as further describe herein.

In some embodiments, computing device 102 displays the virtual control button for a predetermined amount of time. Then, after the predetermined amount of time has expired, computing device 102 removes the virtual control button from the display. For instance, with respect to FIG. 13b, if the user does not interact with the playback controls displayed at location 1304 after the predetermined amount of time expires, computing device 102 can visually remove playback controls from the side-rail display and/or the display entirely. By setting a timer for the predetermined amount of time, and monitoring input via the touchscreen, computing device 102 computing device 102 can determine if a user interacts with the playback control within the time-period. If a user interacts with the playback controls, computing device 102 can reset the timer before it expires and leave the playback controls on the display. However, if the user has not interacted with the playback controls when the timer expires, computing device 102 then determines that there has been a lack of user interaction, and subsequently removes the playback controls from the display.

Recognizing verbal commands to display virtual control buttons provides flexibility to the user as well. For instance, the user can issue multiple verbal commands, each being associated with a respective virtual control button. Being virtual control buttons, they can visually replace one another in a same location as each respective verbal command is received and/or identified. For instance, after issuing a first verbal command to display playback controls at location 1304, the user may then decide to adjust the volume of the playback. Accordingly, the user issues a second verbal command, this time associated with displaying a volume control button. Some embodiments can remove the first virtual control button from display (e.g., the playback controls) and replace it with a second virtual control button (e.g., the volume control). In other words, upon identifying the volume control verbal command, computing device 102 visually replaces playback controls with volume control buttons at location 1304. In turn, this provides the user with easier access, since they can display a variety of control buttons at a same location that they are more prone to use. While the first and second virtual control buttons have been described in the same context of controlling various aspects of playback media, they can alternately or additionally be independent from one another (e.g., be associated with different hardware, applications, and so forth).

Verbal commands also allow people with disabilities to gain access to a computing device. Consider an example in which a person has severe arthritis in their hands such that it is painful or difficult for them to use their fingers. Instead of performing the multi-step touch navigation process, the user can issue verbal commands to access a particular virtual control button. This can help the user to gain more direct access to functionality in a less painful or difficult manner, since the navigation can be performed verbally.

Figure 14:
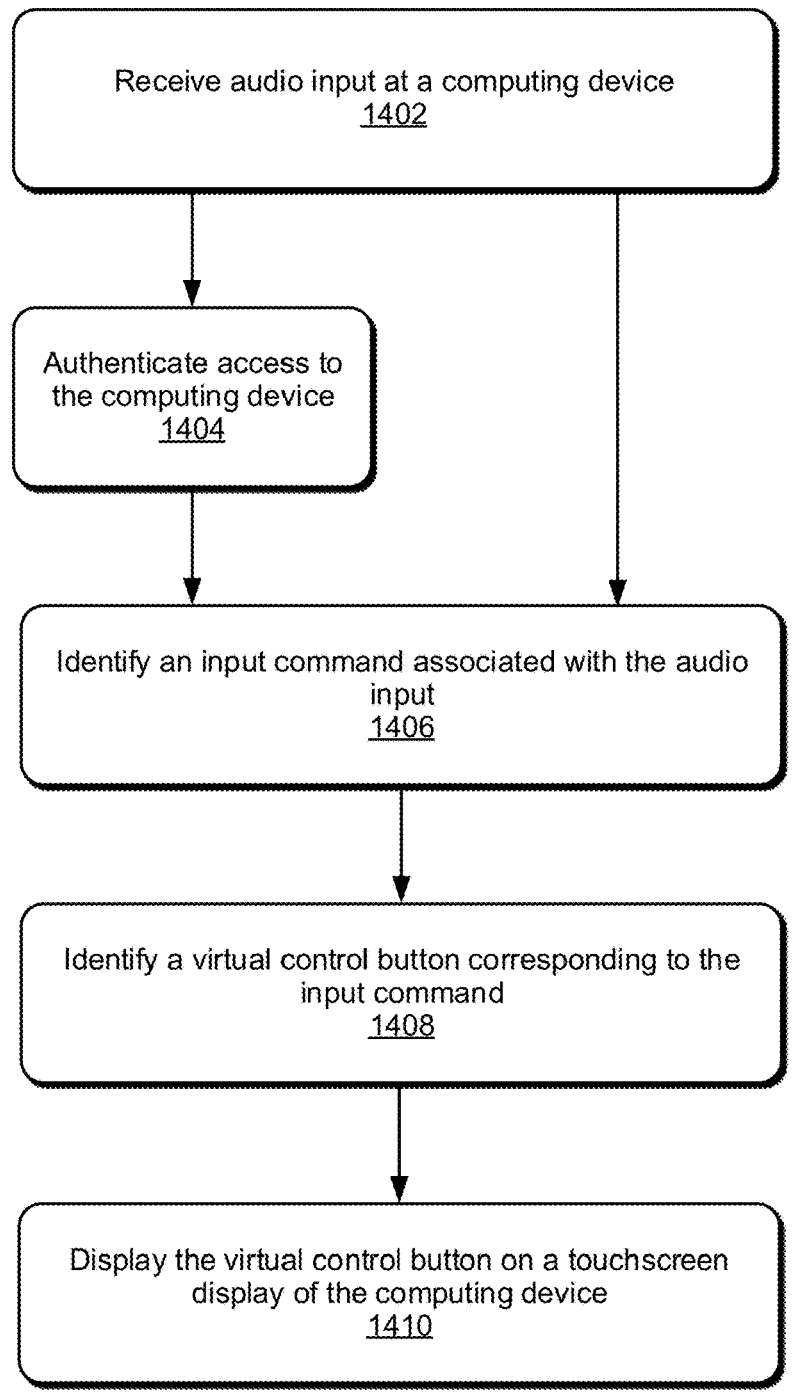
FIG. 14 is a flow diagram that illustrates operations of displaying virtual control buttons using audio input in accordance with one or more embodiments.

FIG. 14 illustrates an example method 1400 that employs voice activation of virtual control buttons in accordance with one or more embodiments. Generally, any services, components, modules, methods, and/or operations described herein can be implemented using software, firmware, hardware (e.g., fixed logic circuitry), manual processing, or any combination thereof. For instance, portions or all of method 1400 can be performed by varying combinations of touch input analysis module 110, grip profile database 112, voice recognition module 114, and/or control placement module 116 of computing device 102 of FIG. 1. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. While method 1400 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 1402, the computing device receives audio input associated with an input command, such as through a microphone. Some embodiments digitize the audio input using an ADC as further described herein. Optionally, at block 1404, some embodiments authenticate access to the computing device. Authentication can be achieved in any suitable manner, such as through authentication of a current grip in contact with the computing device and/or through using voice recognition software on the audio input to validate it is associated with a known user. Alternately or additionally, some embodiments authenticate access by identifying the audio input, or previous audio input, includes validation information as further described herein.

At block 1406, the computing device identifies an input command from the audio input, such as by using speech recognition algorithms to extract and identify words included in the audio input. Responsive to identifying the input command, block 1408 identifies a virtual control button that corresponds to the input command. This can include mapping the words to a name of a virtual control button to identify the virtual control button, mapping the words to a current application that has priority or focus of the computing device, mapping the words to hardware control access, and so forth. Here, the term "mapping" is used to indicate an exact match between the audible words and stored names, or match that is statistically within a predefined threshold to be considered "a close match". Thus, an exact word match need not be performed. Rather, some embodiments utilize a best guess, or identify a virtual control button that has a reference or name is the closest match to the audible words relative to other virtual control buttons.

At block 1410, the computing device displays the virtual control button on a touchscreen display. The display location of the virtual control button can be based upon user preferences, a current grip in contact with the computing device, statistics, and/or a grip profile as further described herein. In some embodiments, the computing device monitors interaction with the virtual control button, such that it subsequently removes the virtual control button from the display if the computing device detects a lack of interaction.

Having considered a discussion of displaying virtual control buttons via verbal commands in accordance with one or more embodiments, consider now the display of virtual control buttons based upon movement in accordance with one or more embodiments.

Virtual Control Button Display Based on Movement

The portability of computing devices allows a user to transport a device in multiple ways. For instance, a user can carry a mobile phone with them from room to room, to work, to the store, back home, and so forth. Over time, as the mobile moves around, the user alters how they grasp or interact with it. For example, the user may alternate back and forth between which hand grasps the mobile phone during a run, use two hands to hold the mobile device when generating a text message, pick up the mobile device with the closest hand upon hearing an incoming call, and so forth. Mechanical buttons cannot adapt to these variations due to their fixed nature. In turn, this can cause inaccuracies in how the user interacts with the mechanical buttons as the relative location of the buttons to the hand changes with each change in grip, and/or cause strain in various hands or fingers as the user reaches to activate a mechanical button.

Various embodiments provide dynamic display locations of virtual control buttons based upon detected movement of a computing device. A computing device displays a virtual control button at a first location, such as a location based upon a grip profile. At some point later, the computing device detects movement via a sensor included in the computing device. The movement can be any type or form of movement, such as a tilt away from an original position or a movement from a resting position to an active position as further described herein. Upon detecting the movement, the computing device visually moves the virtual control button to at least a second location based upon the detected movement.

Figure 15A:
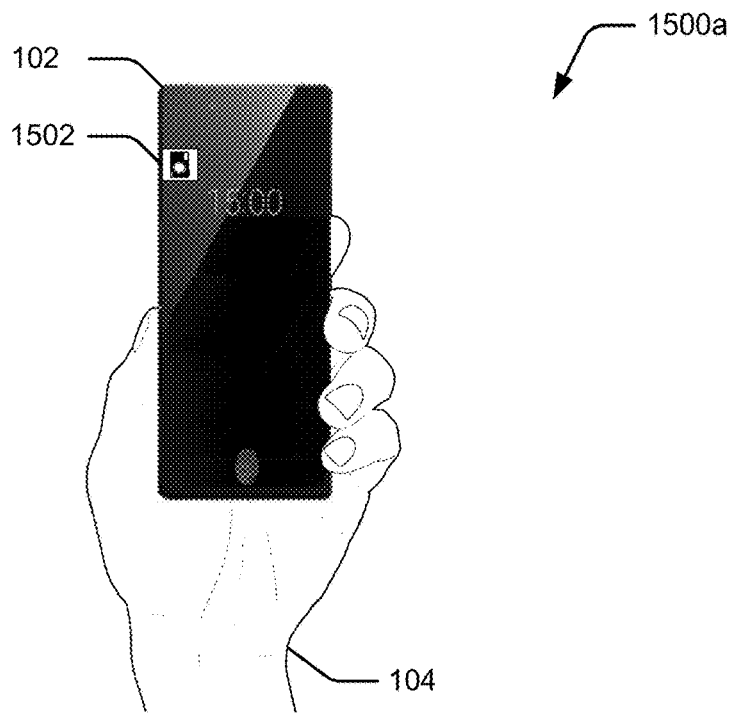
FIGS. 15a and 15b illustrate an example environment in which a computing device displays a virtual control button based upon detected movement in accordance with one or more embodiments.
Figure 15B:
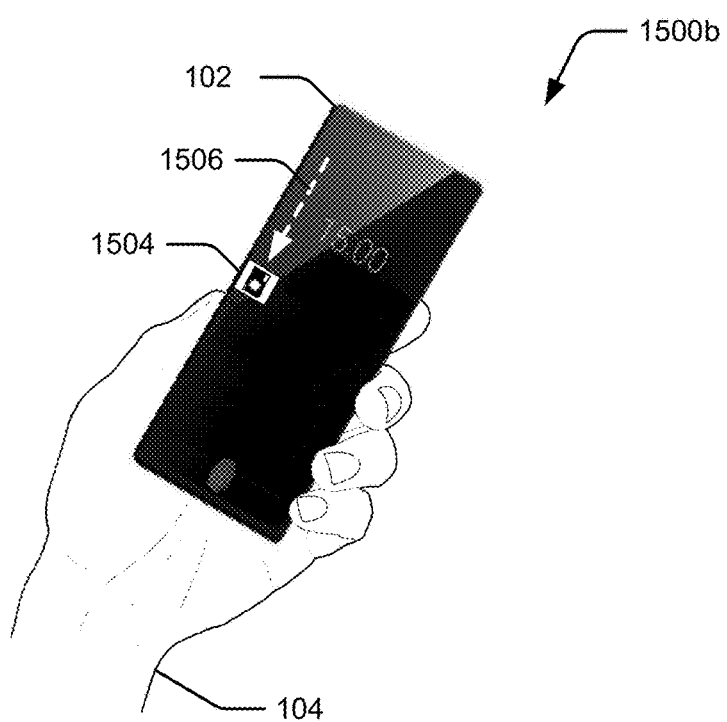

FIGS. 15a and 15b illustrate an example environment at different points in time where a virtual control button visually moves based upon a detected movement. FIG. 15a includes environment 1500a (which represents the example environment at a first point in time), while FIG. 15b includes environment 1500b (which represents the example environment at a second point in time). FIG. 15a also includes computing device 102 and hand 104 of FIG. 1, where hand 104 grips computing device 102. Since the user is currently gripping computing device 102, a current grip profile has been determined by computing device 102.

In environment 1500a, hand 104 has computing device 102 orientated in an initial position that is vertical. Here, computing device 102 displays a virtual control button, in the form of a camera trigger, at an initial display location 1502. When activated, the virtual control button triggers an image capture. The display of the virtual control button can occur in any suitable manner. For instance, computing device 102 can persistently display the virtual control button responsive to receiving a registration request from a camera modular attachment mounted to computing device 102, responsive to receiving a verbal command, responsive to detecting that a user has tapped a location on the touchscreen display corresponding to the fingerprint sensor, and so forth. Further, initial display location 1502 can be based upon any suitable type of information, such as a stored grip profile, a current grip in contact with computing device 102, a default location, user preferences, and so forth.

In environment 1500b, hand 104 has tilted computing device away from its initial (vertical) position at an angle. Some embodiments of computing device monitor when movement has happened, such as by using of various hardware motion sensors (e.g., a gyroscope, an accelerometer, etc.), and visual move displayed virtual control buttons based upon the detected movement. For example, computing device 102 can compare the angle of movement away from its initial position to identify when the angle has exceeded a predefined threshold. When the angle exceeds the predefined threshold, computing device 102 visually moves the virtual control button to a second display location 1504. Here, visual movement 1506 corresponds to the virtual control button visually sliding down the side-rail of computing device 102 and towards a location that corresponds to the thumb of hand 104. Thus, computing device 102 can use a grip profile to identify a current location of a particular digit in contact with the touchscreen display to determine how and where to move the virtual control button.

Some embodiments can visually reset the virtual control button to its original location as well. For instance, when the user returns computing device 102 to its initial position, or within the predefined threshold, the virtual control button can visually return to initial display location 1502. Alternately or additionally, some embodiments reset or return the virtual control button to its initial display position when the user removes their grip from the mobile device, such as when they place the mobile device on a counter or desk, place the mobile device in a carrying pack or bag, etc. The visual resetting of a virtual control button can be time-based as well. For example, some embodiments monitor to determine if the virtual control button receives any user interaction for a predetermined amount of time, such as by using a timer. If the timer expires, and no user interaction is detected, the mobile device can visually reset the virtual control button by visually moving it back to its starting position.

When a computing device displays multiple virtual control buttons, the visual movement can also apply to all of the virtual control buttons or a sub-set thereof. For instance, consider three virtual control buttons visually displayed along the same side-rail in a row. Upon detecting a movement that corresponds to tilting past a predefined threshold, all three virtual control buttons can slide down the side-rail to position themselves closer to digits corresponding to hand 104. As the first virtual control button moves into range of the digits, it may pause momentarily at the first digit it encounters to give the user time to interact with it at that location. In other words, the first virtual control button stops the sliding motion down the side-rail, and is visually maintained at the location corresponding to the first digit. Upon detecting no interaction after a predetermined amount of time, the first virtual control button can then continue the sliding motion on the next closest digit, and so forth. This process can repeat itself with the other virtual control buttons, such that the second virtual control button then slides to the location corresponding to the first digit, moves away after detecting no interaction, and so forth.

Computing device 102 can detect and respond to other forms of movement as well. Consider an example in which a user at work has a mobile device sitting on their desk. Some embodiments detect when the mobile device has moved from its resting position on the desk to an active position of being held by the user. While in the resting position, the mobile device may remove all virtual control buttons from its display. However, upon detecting that it has moved from its resting position on the desk to an active position, the mobile device can display a virtual control button. Detecting this transition from a resting position to an active position can be achieved using a single sensor or a combination of sensors, such as input received via the touchscreen display in combination with a movement sensor. Here, the computing device would transition the virtual control button from an initial "no display" state to a "displayed" state, where the "displayed" state corresponds to a location on the display. Once computing device 102 displays the virtual control button upon detecting the transitions in states, the virtual control button can visually move and respond to further movement of the computing device, such as sliding down a side-rail when the computing device next detects a tilt.

Figure 16:
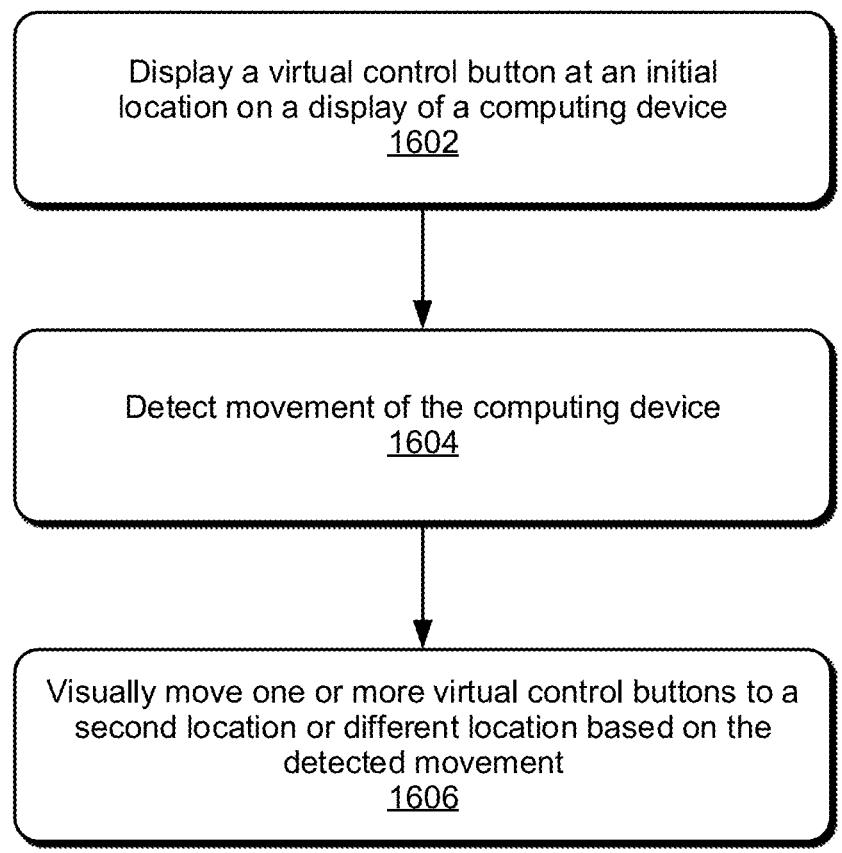
FIG. 16 is a flow diagram that illustrates operations of displaying virtual control buttons based upon detected movement in accordance with one or more embodiments.

FIG. 16 illustrates an example method 1600 that visually moves or displays virtual control buttons based upon motion in accordance with one or more embodiments. Generally, any services, components, modules, methods, and/or operations described herein can be implemented using software, firmware, hardware (e.g., fixed logic circuitry), manual processing, or any combination thereof. For instance, portions or all of method 1600 can be performed by varying combinations of touch input analysis module 110, grip profile database 112, voice recognition module 114, and/or control placement module 116 of computing device 102 of FIG. 1. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 1600 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At block 1602, a computing device displays a virtual control button at an initial location on a display of a computing device. In some embodiments, the computing device uses a touchscreen display to display the virtual control button. The initial location can be based on any suitable type of information, examples of which are provided herein. Some embodiments determine an initial location that is positioned on a side-rail of the computing device.

At block 1604, the computing device detects movement of the computing device (e.g., itself), such as through the use of one or more sensors. Detecting the movement can include detecting a tilting movement, an acceleration movement, a swinging movement (such as a user swinging their arm or hand while walking or running), moving from a resting position to an active position and so forth. Alternately or additionally, detecting the movement can include identifying when the movement has exceeded a predetermined threshold, or has moved back inside the predetermined threshold.

At block 1606, and responsive to detecting the movement, the computing device visually moves one or more virtual control buttons to a second location or different location based upon the detected movement. For example, visually moving a virtual control button can include sliding the virtual control button along a side-rail of a computing device, pausing at the second location, and then continuing to slide along the side-rail to a third location. Alternately or additionally, the virtual button(s) can disappear at the initial location and reappear at the second location. To determine the second location, some embodiments receive touch input to identify a current grip in contact with the computing device, distinguish each particular digit associated with the grip from one another, and base the second location on a particular digit.

By incorporating virtual control buttons in lieu of mechanical buttons, computing devices can visually move the virtual control buttons to locations that are more optimally suited to actions performed by the user. For instance, by monitoring touch input and/or using movement sensors, virtual control buttons can be visually positioned closer to particular digits of a user's hand and alleviate the user from overstretching to activate the virtual control button. Consider a case in which the user tilts a mobile device from a vertical position to a horizontal position in order to capture an image. By visually moving a corresponding capture control button based upon this movement, the computing device can move the capture control button a position that makes it easier for the user to activate. In turn, this increases the user's chances of capturing a clear image focused on the desired scene. As another example, consider a user picking up a mobile device from a resting positing to an active position in order to answer an incoming call. Based upon movement and grip information, the mobile device can display an answer control button at a location corresponding to a particular digit or finger based on which hand grips the mobile device, thus making it easier for the user to answer the call. Thus, dynamic movement of virtual control buttons helps to optimize how a user interacts with a computing device as the user moves the computing device.

Having considered a discussion of dynamic movement of virtual control buttons in accordance with one or more embodiments, consider now an example computing device that can implement the embodiments described above.

Example Device

Figure 17:
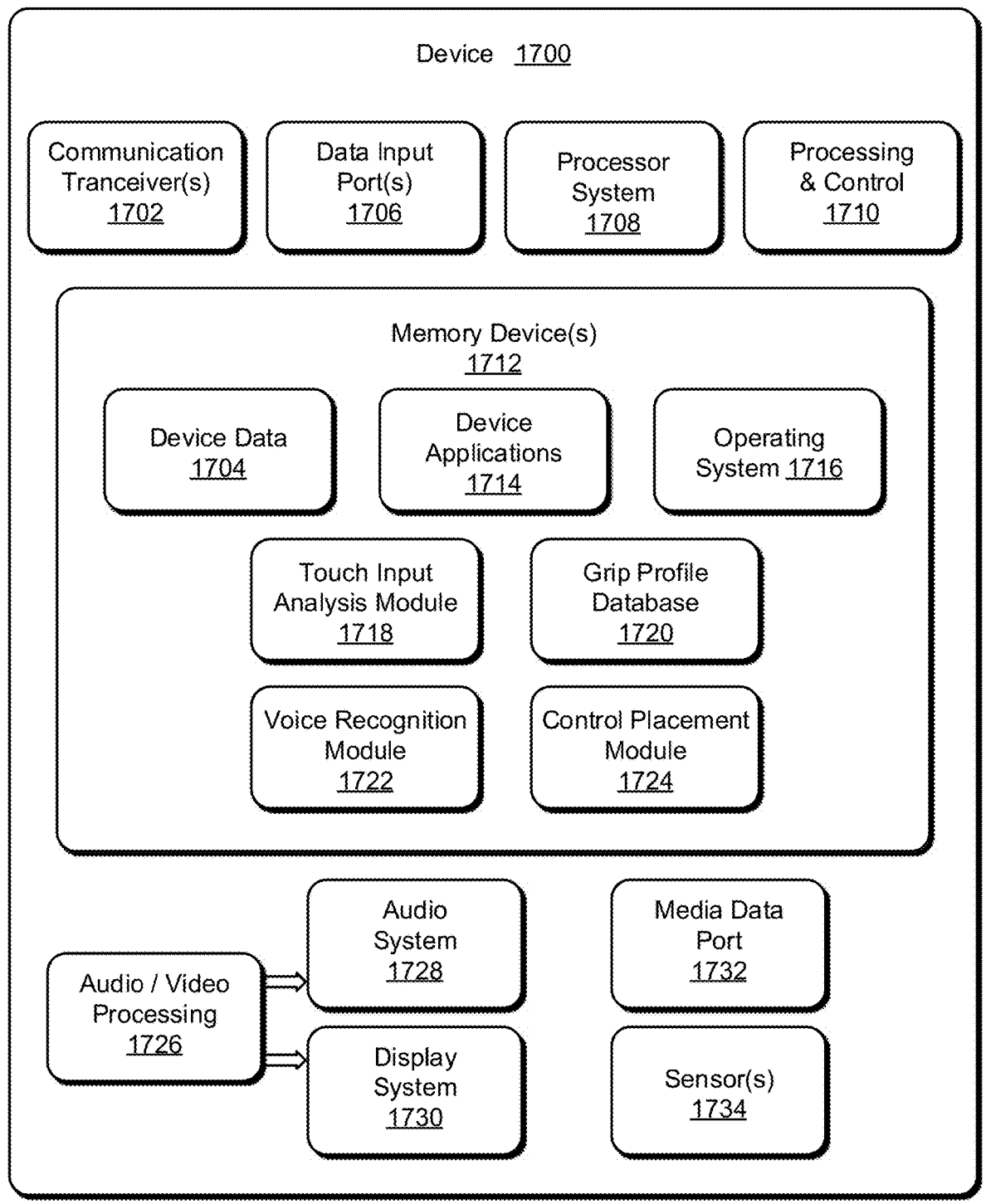
FIG. 17 illustrates various components of an example device that can implement various embodiments.

FIG. 17 illustrates various components of an example device 1700 in which virtual control buttons on a computing device can be implemented. The example device 1700 can be implemented as any suitable type of computing device, such as any type of mobile phone, tablet, computing, communication, entertainment, gaming, media playback, and/or other type of device. For example, computing device 102 shown in FIG. 1 may be implemented as the example device 1700.

The device 1700 includes communication transceivers 1702 that enable wired and/or wireless communication of device data 1704 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 1700 may also include one or more data input ports 1706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones, cameras, and/or modular attachments.

The device 1700 includes a processing system 1708 of one or more processors (e.g., any of microprocessors, controllers, and the like) and/or a processor and memory system implemented as a system-on-chip (SoC) that processes computer-executable instructions. In some embodiments, processor system 1708 includes a low power contextual processor and an application processor as further described herein. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified at 1710. The device 1700 may further include any type of a system bus or other data and command transfer system that couples the various components within the device. A system bus can include any one or combination of different bus structures and architectures, as well as control and data lines.

The device 1700 also includes computer-readable storage memory or memory devices 1712 that enable data storage, such as data storage devices that can be accessed by a computing device, and that provide persistent storage of data and executable instructions (e.g., software applications, programs, functions, and the like). Examples of the computer-readable storage memory or memory devices 1712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1700 may also include a mass storage media device.

The computer-readable storage memory provides data storage mechanisms to store the device data 1704, other types of information and/or data, and various device applications 1714 (e.g., software applications). For example, an operating system 1716 can be maintained as software instructions with a memory device and executed by the processing system 1708. The device applications may also include a device manager, such as any form of a control application, software application, signal-processing and control module, code that is native to a particular device, a hardware abstraction layer for a particular device, and so on. In this example, the device 1700 includes a touch input analysis module 1718, a grip profile database 1720, a voice recognition module 1722, and a control placement module 1724.

Touch input analysis module 1718 identifies various forms of touch input into device 1700, and identify a grip profile from the information. This can include identifying and/or generating a profile associated with a current grip in contact with device 1700, as well as mapping the current grip in contact with device 1700 to a previously stored grip profile. Grip profile database 1720 stores grip information and/or user preferences associated with a grip profile. For instance, touch input analysis module 1718 can pull user preference information from grip profile database 1720 upon identifying a matching grip profile to the current grip. Voice recognition module 1722 receives input from an audio sensor and extracts verbal words or commands from the audio input. Control placement module 1724 manages the display of virtual control buttons. For instance, control placement module 1724 can identify a current or default location of where to display a virtual control button. Alternately or additionally, control placement module 1724 manages visually moving the virtual control button to a location based upon user preferences stored in grip profile database 1720 and/or a current grip. Control placement module 1724 sometimes receives input from touch input analysis module 1718, grip profile database 1720, and/or voice recognition module 1722 to determine which virtual control buttons to display, where to display them, and/or whether to visually move the virtual control buttons.

The device 1700 also includes an audio and/or video processing system 1726 that generates audio data for an audio system 1728 and/or generates display data for a display system 1730.

In some embodiments, display system 1730 includes a touchscreen display that wraps or extends around the edges of a housing component of device 1700 such that device 1700 includes touch input capacitance around its edges for grip profile detection as further described herein. Alternately or additionally, display system 1730 works in concert with touch input analysis module 1718 and/or control placement module 1724 to facilitate the display and relocation of virtual control buttons.

The audio system 1728 and/or the display system 1730 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1732. In implementations, the audio system and/or the display system are integrated components of the example device. Alternatively, the audio system and/or the display system are external, peripheral components to the example device.

Device 1700 also includes sensor(s) 1734 that can be used to detect motion of, or around, device 1700. Sensors(s) 1734 can also include audio sensors to detect or receive audio input to device 1700. In some embodiments, sensor(s) 1734 provide input to voice recognition module 1722 and/or control placement module 1724 that is subsequently used to determine display locations and/or visual movement of virtual control buttons as further described herein. Alternately or additionally, sensors 1734 can include haptic sensors that are configured to provide haptic feedback upon activation of a virtual control button as further described herein.

CONCLUSION

Various embodiments provide virtual control buttons on a computing device, such as a mobile device, e.g. a smart phone, to produce a computing device without mechanical user interface buttons. The computing device can include a touchscreen display overlaid on the computing device such that a front surface of the touchscreen display covers a front surface of the computing device, and side surfaces of the touchscreen display wrap around a top edge, a bottom edge, and side edges of the computing device. To simplify building a computing device, and in lieu of mechanical user interface buttons, various embodiments display virtual control buttons via the touchscreen display. As various surfaces of the touchscreen display detect touch input, some embodiments identify a grip profile of a user, and visually move the virtual control buttons to locations based on the grip profile.

Although various virtual control button embodiments have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

We claim:

1. A computing device comprising:
a housing component defined by a top edge, a bottom edge, a left edge and a right edge;
a touchscreen display defining at least a front surface of the housing component and wrapping around to define at least portions of at least one of the top edge, bottom edge, left edge, or right edge;
one or more motion sensors;
one or more processors; and
one or more computer-readable storage devices storing processing-executable instructions which, responsive to execution by the one or more processors, cause the computing device to perform operations comprising:
receiving touch input on at least one edge of the touchscreen display, the touch input corresponding to the computing device being gripped by a user;

determining that the computing device has moved from a resting position to an active position;

displaying, in response to determining that the computing device has moved from the resting position to an initial active position, a virtual control button at a first location;

identifying a grip profile associated with the touch input, the grip profile corresponding to placement of a user's digits about the at least one edge;

detecting, via the one or more motion sensors, movement of the computing device relative to the initial active position; and responsive to detecting the movement of the computing device, identifying both a first particular digit based on the grip profile and a first current location associated with the first particular digit, visually moving the virtual control button, displayed on the touchscreen display at the first location, towards the first current location associated with the first particular digit based at least in part on the detected movement, maintaining the virtual control button at the first current location associated with the first particular digit for a predetermined amount of time, detecting that the virtual control button has not received user interaction for the predetermined amount of time, and sliding, in response to detecting that the virtual control button has not received user interaction for the predetermined amount of time, the virtual control button towards a second current location associated with a second particular digit, the second particular digit being a next closest digit to the first particular digit.

2. The computing device as recited in claim 1, wherein said detecting movement of the computing device further comprises detecting movement away from the initial active position by a predefined threshold.

3. The computing device as recited in claim 1, wherein the virtual control button comprises an image capture control button.

4. The computing device as recited in claim 1, the visually moving the virtual control button comprising sliding the virtual control button along a side-rail of the touchscreen display,
continuing sliding, in response to detecting that the virtual control button has not received user interaction for the predetermined amount of time, the virtual control button towards a second current location associated with a second particular digit, the second particular digit being a next closest digit to the first particular digit.

5. The computing device as recited in claim 1, the operations further comprising:
detecting that the computing device has moved back to the initial active position; and
visually relocating, in response to detecting that the computing device has moved back to the initial active position, the virtual control button to the first location.

6. The computing device as recited in claim 1, the operations further comprising:
detecting that the virtual control button has not received any user interaction for a predetermined amount of time; and
visually relocating, in response to detecting that the virtual control button has not received any user interaction for the predetermined amount of time, the virtual control button to the first location.

7. A computer-implemented method comprising:
receiving, on at least one edge of a touchscreen display that wraps around from a front surface of a computing device to extend over at least one of a top edge, a bottom edge, a left edge, or a right edge of the computing device, touch input corresponding to a grip profile of a user;
determining that the computing device has moved from a resting position to an active position;
displaying, in response to determining that the computing device has moved from the resting position to an initial active position, a virtual control button at a first location;
identifying a grip profile associated with the touch input, the grip profile corresponding to placement of a user's digits about the at least one edge;
detecting movement of the computing device relative to the initial active position; and
responsive to detecting the movement of the computing device, identifying both a first particular digit based on the grip profile and a first current location associated with the first particular digit, visually moving the virtual control button, displayed on the touchscreen display at a first location, towards the first current location associated with the first particular digit, maintaining the virtual control button at the first current location associated with the first particular digit for a predetermined amount of time, detecting that the virtual control button has not received user interaction for the predetermined amount of time, and sliding, in response to detecting that the virtual control button has not received user interaction for the predetermined amount of time, the virtual control button towards a second current location associated with a second particular digit, the second particular digit being a next closest digit to the first particular digit.

8. The computer-implemented method of claim 7, wherein said detecting movement further comprises:
determining the computing device has tilted away from the initial active position by an angle that exceeds a predetermined threshold.

9. The computer-implemented method as recited in claim 7, wherein the virtual control button comprises an image capture control button.

10. The computer-implemented method as recited in claim 7, the visually moving the virtual control button comprising sliding the virtual control button along a side-rail of the touchscreen display.

11. The computer-implemented method as recited in claim 7, further comprising:
detecting that the computing device has moved back to the initial active position; and
visually relocating, in response to detecting that the computing device has moved back to the initial active position, the virtual control button to the first location.

12. The computer-implemented method as recited in claim 7, further comprising:
detecting that the virtual control button has not received any user interaction for a predetermined amount of time; and
visually relocating, in response to detecting that the virtual control button has not received any user interaction for the predetermined amount of time, the virtual control button to the first location.

13. A mobile phone device comprising:
a housing component defined by a top edge, a bottom edge, a left edge and a right edge;

a touchscreen display defining at least a front surface of the housing component and wrapping around to define at least portions of at least one of the top edge, bottom edge, left edge, or right edge, the touchscreen display comprising an aperture-free surface;

a motion sensor;

one or more processors; and one or more computer-readable storage devices storing processing-executable instructions which, responsive to execution by the one or more processors, cause the mobile phone device to perform operations comprising:

receiving, on at least one edge of the touchscreen display, touch input corresponding to a grip profile of a user;

determining that the mobile phone device has moved from a resting position to an active position;

displaying, in response to determining that the mobile phone device has moved from the resting position to an initial active position, a virtual control button at a first location;

identifying a grip profile associated with the touch input, the grip profile corresponding to placement of a user's digits about the at least one edge;

detecting movement of the mobile phone device away from the initial active position by a predefined threshold; and responsive to detecting the movement of the mobile phone device, identifying both a first particular digit based on the grip profile and a first current location associated with the first particular digit, visually moving the virtual control button, displayed on the touchscreen display at the first location, towards the first current location associated with the first particular digit, maintaining the virtual control button at the first current location associated with the first particular digit for a predetermined amount of time, detecting that the virtual control button has not received user interaction for the predetermined amount of time, and sliding, in response to detecting that the virtual control button has not received user interaction for the predetermined amount of time, the virtual control button towards a second current location associated with a second particular digit, the second particular digit being a next closest digit to the first particular digit.

14. The mobile phone device as recited in claim 13, wherein the virtual control button comprises an image capture control button.

15. The mobile phone device as recited in claim 13, the visually moving the virtual control button comprising sliding the virtual control button along a side-rail of the touchscreen display.

16. The mobile phone device as recited in claim 13, the operations further comprising:

detecting that the mobile phone device has moved back to the initial active position; and visually relocating, in response to detecting that the mobile phone device has moved back to the initial active position, the virtual control button to the first location.

17. The mobile phone device as recited in claim 13, the operations further comprising:

detecting that the virtual control button has not received any user interaction for a predetermined amount of time; and visually relocating, in response to detecting that the virtual control button has not received any user interaction for the predetermined amount of time, the virtual control button to the first location.

* * * * *